United States Patent
Takeuchi et al.

(10) Patent No.: US 8,532,904 B2
(45) Date of Patent: Sep. 10, 2013

(54) DRIVING SUPPORT DEVICE, DRIVING SUPPORT METHOD, AND DRIVING SUPPORT PROGRAM

(75) Inventors: Atsushi Takeuchi, Anjo (JP); Takayuki Miyajima, Anjo (JP); Fumiharu Ogawa, Okazaki (JP); Yoshito Kondo, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 254 days.

(21) Appl. No.: 12/866,432

(22) PCT Filed: Feb. 3, 2009

(86) PCT No.: PCT/JP2009/000412
§ 371 (c)(1),
(2), (4) Date: Aug. 5, 2010

(87) PCT Pub. No.: WO2009/101769
PCT Pub. Date: Aug. 20, 2009

(65) Prior Publication Data
US 2010/0324796 A1 Dec. 23, 2010

(30) Foreign Application Priority Data
Feb. 15, 2008 (JP) .................................. 2008-035351

(51) Int. Cl.
*B60T 8/32* (2006.01)
*B60T 7/12* (2006.01)
*G06F 7/00* (2006.01)
*G06F 7/70* (2006.01)

(52) U.S. Cl.
USPC ................... 701/93; 701/70; 701/72; 701/79; 701/96

(58) Field of Classification Search
None
See application file for complete search history.

(56) References Cited

U.S. PATENT DOCUMENTS

| 5,474,505 | A | 12/1995 | Seidel et al. |
| 6,836,719 | B2 * | 12/2004 | Andersson et al. ............. 701/93 |
| 2001/0056318 | A1 | 12/2001 | Tashiro et al. |
| 2005/0240334 | A1 * | 10/2005 | Matsumoto et al. ............ 701/93 |
| 2006/0190158 | A1 * | 8/2006 | Shiiba et al. .................... 701/70 |
| 2006/0290202 | A1 * | 12/2006 | Shibata et al. ................. 303/165 |

FOREIGN PATENT DOCUMENTS

| JP | 06-511301 T | 12/1994 |
| JP | 11-063211 A | 3/1999 |
| JP | 2000-130207 A | 5/2000 |
| JP | 2002-081345 A | 3/2002 |
| JP | 2006-138457 A | 6/2006 |
| JP | 2007-168741 A | 7/2007 |

OTHER PUBLICATIONS

Search Report issued in Chinese Office Action dated Dec. 4, 2012 for counterpart Chinese Application No. 20090102642.

* cited by examiner

*Primary Examiner* — Fahd Obeid
(74) *Attorney, Agent, or Firm* — Sughrue Mion, PLLC

(57) ABSTRACT

A target vehicle speed of when a vehicle travels a predetermined forward section is acquired. An acceleration gear ratio for acceleration of the vehicle to reach a vehicle speed higher than the target vehicle speed after the travel of the predetermined section is acquired. The gear ratio of the vehicle is set to the acceleration gear ratio before the vehicle reaches the start point of the predetermined section. Before the vehicle reaches the start point of the predetermined section, the vehicle speed is lowered to the target vehicle speed.

14 Claims, 9 Drawing Sheets

DRIVING SUPPORT DEVICE, DRIVING SUPPORT METHOD, AND DRIVING SUPPORT PROGRAM

TECHNICAL FIELD

The present invention relates to a driving support device, method, and program for supporting driving of a vehicle.

BACKGROUND ART

In the related art, for a device controlling a braking force of a vehicle, there are known techniques to switch to a shift speed by which the deceleration closest to a target deceleration can be obtained in the range not surpassing the target deceleration, and to decelerate the vehicle using engine braking at this shift speed while assisting the deceleration with brakes so that an insufficiency in deceleration by engine braking is supplemented (see, for example, Patent Document 1).
Patent Document 1: Japanese Patent Publication No. 3858952

DISCLOSURE OF THE INVENTION

Problem to be Solved by the Invention

In the related art, smooth acceleration when the vehicle accelerates after deceleration has not been possible.

Specifically, the related art focuses on a target deceleration, and a shift speed is switched to a shift speed by which the deceleration closest to the target deceleration speed can be obtained in the range not surpassing the target deceleration. However, when the vehicle accelerates after a decelerating operation, for example, when the vehicle decelerates before entering a predetermined section and accelerates after exiting the predetermined section, switching of the shift speed according to the target deceleration may result in that the speed ratio in the stage of acceleration is not suitable for accelerating the vehicle. Thus, the acceleration cannot be performed smoothly.

The present invention is made in view of the above-described problem, and it is an object of the present invention to provide a technique capable of smooth acceleration when the vehicle accelerates after deceleration.

Means for Solving the Problem

For achieving the above object, in the present invention, based on a target vehicle speed when a vehicle travels a predetermined section existing ahead of the vehicle, an accelerating speed ratio for accelerating the vehicle to a vehicle speed higher than the target vehicle speed is obtained. Then, a speed ratio in the vehicle is set to the accelerating speed ratio before the vehicle reaches the start point of a predetermined section, and a speed of the vehicle is reduced to the target vehicle speed before the vehicle reaches the start point of the predetermined section. That is, in the present invention, the accelerating speed ratio is determined focusing on the speed ratio for accelerating the vehicle after the vehicle travels the predetermined section. Therefore, according to the present invention, before the vehicle reaches the predetermined section, the accelerating speed ratio becomes suitable for accelerating the vehicle to a vehicle speed higher than the target vehicle speed, and thus it is possible to perform smooth acceleration in the accelerating stage after the vehicle travels the predetermined section.

Here, a vehicle speed information obtaining means may be able to obtain, with respect to the predetermined section ahead of the vehicle, a target vehicle speed when traveling the predetermined section, and may obtain information indicating the vehicle speed directly or indirectly. For obtaining the information directly, it is possible to employ a structure to correlate a target vehicle speed in advance with a predetermined section which is set in advance, and obtain the target vehicle speed correlated with this predetermined section. For obtaining the information indirectly, it is possible to employ a structure to determine a target vehicle speed based on information indicating the predetermined section and a road before and after this section.

Further, the predetermined section may be a section where it is preferred to decelerate the vehicle to the target vehicle speed before the vehicle reaches this section and accelerate the vehicle after the vehicle travels the predetermined section at the target vehicle speed, and a structure to select a section where the vehicle should travel while maintaining a target vehicle speed (or at a speed not higher than the target vehicle speed) may be employed as the predetermined section. Examples include a curve section, a section in a predetermined distance before and after the point of an ETC (Electronic toll collection) gate where it is recommended to decelerate the vehicle to a vehicle speed limit or lower when the vehicle is passing through the gate, a low speed section where it is instructed to travel at or lower than a vehicle speed limit, and the like. The predetermined section may be defined by a location. Further, the target vehicle speed is a preferred vehicle speed when the vehicle travels this predetermined section, and may be set in advance. For example, in a curve section, it is preferred to travel a section with a constant radius in the curve section at a constant speed, and thus it is possible to employ a structure to set the constant speed as the target vehicle speed. As described above, when a vehicle speed limit is defined, this vehicle speed limit may be set as the target vehicle speed (for example, 20 km/h for the ETC gate and 10 km/h for the low speed section).

Accelerating speed ratio obtaining means may be able to obtain a speed ratio for accelerating the vehicle to a vehicle speed higher than the target vehicle speed after the vehicle travels the predetermined section, and may be able to obtain at least a speed ratio with which further acceleration from the target vehicle speed can be achieved. For example, the obtaining means may be able to obtain a speed ratio with which the vehicle can accelerate from the target vehicle speed to a specific vehicle speed higher than the target vehicle speed or a speed ratio with which the vehicle can travel at a vehicle speed higher than the target vehicle speed when the rotation speed of a driving source is at a specific value. In short, acceleration may be performed without changing the speed ratio in the acceleration stage after the vehicle travels the predetermined section by setting these speed ratios to the accelerating speed ratio and setting this accelerating speed ratio before the vehicle completes traveling the predetermined section. As a result, it becomes possible to smoothly accelerate the vehicle after the vehicle travels the predetermined section. The speed ratio may be necessary and sufficient speed ratio for accelerating the vehicle at least to a vehicle speed higher than the target vehicle speed, and a speed ratio for smoother acceleration may be determined in advance. For example, it is possible to estimate parameters of a throttle opening/closing operation, the rotation speed of a vehicle driving source, and/or the like at the time of starting acceleration, and select a speed ratio or the like with which acceleration can be most efficiently achieved based on this estimation.

Speed ratio control means may be able to set a speed ratio of the vehicle to the accelerating speed ratio before the vehicle reaches the start point of the predetermined section. Specifically, when the speed ratio of the vehicle is set to the accelerating speed ratio suitable for acceleration before the vehicle reaches the start point of the predetermined section, normally it is changed to a larger speed ratio in the vehicle traveling a road before the predetermined section. Accordingly, it is possible to supplement deceleration before the vehicle reaches the predetermined section by setting the speed ratio to the accelerating speed ratio. Further, when the accelerating speed ratio is maintained without change after the vehicle reaches the predetermined section, the vehicle can travel stably in this predetermined section. Setting of the speed ratio may be performed with respect to a transmission unit (for example, a transmission with a torque converter) mounted in the vehicle. That is, the speed ratio is set based on an instruction of speed ratio to this transmission unit, and the transmission unit may be able to switch to the speed ratio as instructed based on this instruction.

Deceleration control means may be able to reduce the speed of the vehicle to the target vehicle speed before the vehicle reaches the start point of the predetermined section. Therefore, it may be able to decelerate the vehicle by controlling a decelerating unit for decelerating the vehicle, for example, an adjusting device (such as a throttle) of the rotation speed of the driving source and/or brakes. Further, as a structure to change the vehicle to the target vehicle speed, for example, it is possible to employ a structure to decelerate by feedback control with respect to a reference parameter, or the like. The reference parameter may be a reference indicator for changing the speed of the vehicle to the target vehicle speed. A deceleration, a transition of the vehicle speed, and/or the like necessary for changing the current speed of the vehicle to the target vehicle speed within a distance from the current position of the vehicle to the start point of the predetermined section can be set as these reference parameters.

Further, the accelerating speed ratio may be obtained based on a necessary acceleration amount for increasing the target vehicle speed to the recommended vehicle speed. For example, it is structured such that the vehicle speed information obtaining means obtains the recommended vehicle speed after the vehicle travels the predetermined section, and the accelerating speed ratio obtaining means obtains a necessary acceleration amount for accelerating the vehicle from the target vehicle speed to the recommended vehicle speed and obtains an accelerating speed ratio for allowing the vehicle to travel with this necessary acceleration amount. With this structure, it is possible to easily obtain the accelerating speed ratio for accelerating the vehicle to the recommended vehicle speed. The recommended vehicle speed may be a vehicle speed higher than the target vehicle speed, and for example, a vehicle speed limit on a road after the vehicle travels the predetermined section can be set as the recommended vehicle speed. Further, a vehicle speed before the deceleration control means performs the deceleration control processing for the predetermined section or a vehicle speed at the time point when the deceleration control processing is started may be set as the recommended vehicle speed. Moreover, in a vehicle performing auto-cruise control, the vehicle speed set to be maintained may be set as the recommended vehicle speed.

The necessary acceleration amount may be an acceleration amount for changing the vehicle from the target vehicle speed to the recommended vehicle speed, and a parameter for evaluating energy outputted in the vehicle to change the vehicle speed from the target vehicle speed to the recommended vehicle speed may be set as the necessary acceleration amount. As this parameter, it is possible to employ, for example, an acceleration, torque, engine output, or the like.

Further, when obtaining the necessary acceleration amount, an acceleration amount corresponding to a road after the predetermined section may be obtained. For example, it is possible to employ a structure to set an acceleration section of a predetermined distance in advance after the end point of the predetermined section, and obtain a necessary acceleration amount for changing the target vehicle speed to the recommended vehicle speed in this acceleration section (for example, an acceleration when performing the acceleration by uniform acceleration). The acceleration section may be defined corresponding to each predetermined section and may be a section having a predetermined distance, and it may be structured to appropriately change the acceleration section corresponding to the shape of a road, or the like. For example, a clothoid section set after a curve section may be set as the acceleration section, or a predetermined section between a certain curve section and a next curve section may be set as the acceleration section when there are continuous curve sections.

Further, as a structure example for determining a speed ratio, it is possible to employ a structure to set a speed ratio which minimizes fuel consumption as the accelerating speed ratio among speed ratios with which an acceleration amount equal to or larger than the necessary acceleration amount can be generated when a driving source of the vehicle is at a predetermined rotation speed. Specifically, the accelerating speed ratio is set to a speed ratio with which the vehicle speed can be changed to the recommended vehicle speed when acceleration is performed while keeping the speed ratio and by which fuel can be used most efficiently. With this structure, it is possible to use the fuel efficiently. The predetermined rotation speed may be a default value of rotation speed of the driving source at the time point of starting acceleration of the vehicle, and may be determined based on statistic values or the like or may be a value set in advance as the rotation speed at the time point of starting acceleration when control is performed for accelerating the vehicle with the necessary acceleration amount. Further, the driving source may be able to drive the vehicle by a rotational force, and the driving source corresponds to, for example, an engine and a motor.

Further, as a structure example for determining the speed ratio, it is possible to employ a structure to set the smallest speed ratio as the accelerating speed ratio among speed ratios with which an acceleration amount equal to or larger than the necessary acceleration amount can be generated when the driving source of the vehicle is at a predetermined rotation speed. Specifically, the accelerating speed ratio is set to a speed ratio with which the vehicle speed can be changed to the recommended vehicle speed when acceleration is performed while keeping the speed ratio and with which the rotation speed of the driving source on the input side is transmitted to the output side at a reduced speed of which degree of reduction is the smallest. With this structure, the vehicle can accelerate from the target vehicle speed to the recommended vehicle speed while suppressing increase of the rotation speed of the driving source as much as possible, and it is possible to accelerate the vehicle efficiently.

Furthermore, as a timing for setting the speed ratio to the accelerating speed ratio, a timing to prevent decrease in traveling stability of the vehicle may be employed. For example, it is possible to employ a structure to estimate a time point at which the degree of decrease in traveling stability of the vehicle surpasses a predetermined degree by setting the speed ratio to the accelerating speed ratio, and set the speed ratio to the accelerating speed ratio before this time point. With this structure, while preventing decrease of the traveling stability to a predetermined degree or more, the speed ratio can be set to the accelerating speed ratio. Therefore, it is possible to set the speed ratio to the accelerating speed ratio while suppressing the influence of shifting on the behavior of the vehicle. The indicator to identify the time point at which the degree of decrease in traveling stability surpasses a predetermined degree may be a time, or may be a distance. It is possible to employ various structures, for example, a structure to determine a force or a possibility to slip at a time point after a predetermined time interval (two seconds for example) from the current time point, or a structure to determine a force or a possibility to slip at a position ahead of the current position in a predetermined distance.

Furthermore, when deceleration is performed by selecting a speed ratio by which the deceleration closest to the target deceleration can be obtained as in the above-described related art, it is possible to decelerate by effectively using the deceleration by engine braking, but the shock applied to the vehicle while shifting becomes relatively large due to the engine braking functioning effectively. However, in the present invention, the accelerating speed ratio is determined focusing on acceleration rather than a deceleration while decelerating, and thus the shock to be applied to the vehicle while shifting can be suppressed relatively low. Further, in the structure to select a speed ratio by which the deceleration closest to the target deceleration can be obtained, changing the speed ratio is performed in a relatively earlier stage for effectively using the deceleration. Thus, when the speed ratio is switched in the earlier stage after deceleration is started, the rotation speed of the driving source becomes high and this high rotation speed state continues for a long time, which easily gives the driver a sense of discomfort. However, in the present invention, the accelerating speed ratio is determined focusing on acceleration, and thus the speed ratio is switched in a relatively late stage after deceleration is started, which does not give this kind of sense of discomfort to the driver.

Moreover, the traveling stability may be evaluated based on a force acting on the vehicle and a force which causes the vehicle to slip. For example, it may be structured to estimate a force acting on the vehicle when a speed ratio is set to the accelerating speed ratio in front of the vehicle, and set the speed ratio to the accelerating speed ratio before the force acting on the vehicle becomes the force to cause the vehicle to slip. With this structure, the speed ratio can be set so as not to cause the vehicle to slip by setting the speed ratio to the accelerating speed ratio. Also here, the indicator to identify the time point at which the force acting on the vehicle becomes the force which causes the vehicle to slip may be a time, or may be a distance. It is possible to employ various structures, for example, a structure to determine a force or a possibility to slip at a time point after a predetermined time interval (two seconds for example) from the current time point, or a structure to determine a force or a possibility to slip at a position ahead of the current position in a predetermined distance.

Moreover, an approach to perform deceleration control by setting a speed ratio for accelerating the vehicle from the target vehicle speed when the vehicle travels the predetermined distance as in the present invention may be applied as a program or a method. Further, a driving support device, a program, and a method as described above may be achieved as an independent driving support device or may be achieved using parts common to respective units provided in the vehicle, and thus include various aspects. For example, it is possible to provide a navigation device, a method, and a program including the driving support device as described above. Further, the present invention may be modified appropriately, for example, a part is designed to be software and a part is designed to be hardware. Furthermore, the present invention is also effective as a recording medium of a program controlling the driving support device. Of course, the recording medium of software may be either a magnetic recording medium or a magneto-optical recording medium, and any recording medium which will be developed in the future can be considered in exactly the same way.

DESCRIPTION OF THE REFERENCE NUMERALS

10 . . . navigation device, 20 . . . control unit, 21 . . . navigation program, 21a . . . vehicle speed information obtaining unit, 21b . . . necessary acceleration amount obtaining unit, 21c . . . accelerating speed ratio obtaining unit, 21d . . . speed ratio control unit, 21e . . . deceleration control unit, 21f . . . acceleration control unit, 30 . . . recording medium, 30a . . . map information, 30a1 . . . curve section information, 30a3 . . . acceleration section information, 41 . . . GPS receiving unit, 42 . . . vehicle speed sensor, 43 . . . gyro sensor, 44 . . . transmission unit, 45 . . . braking unit, 46 . . . throttle control unit

BEST MODES FOR CARRYING OUT THE INVENTION

Figure 1:
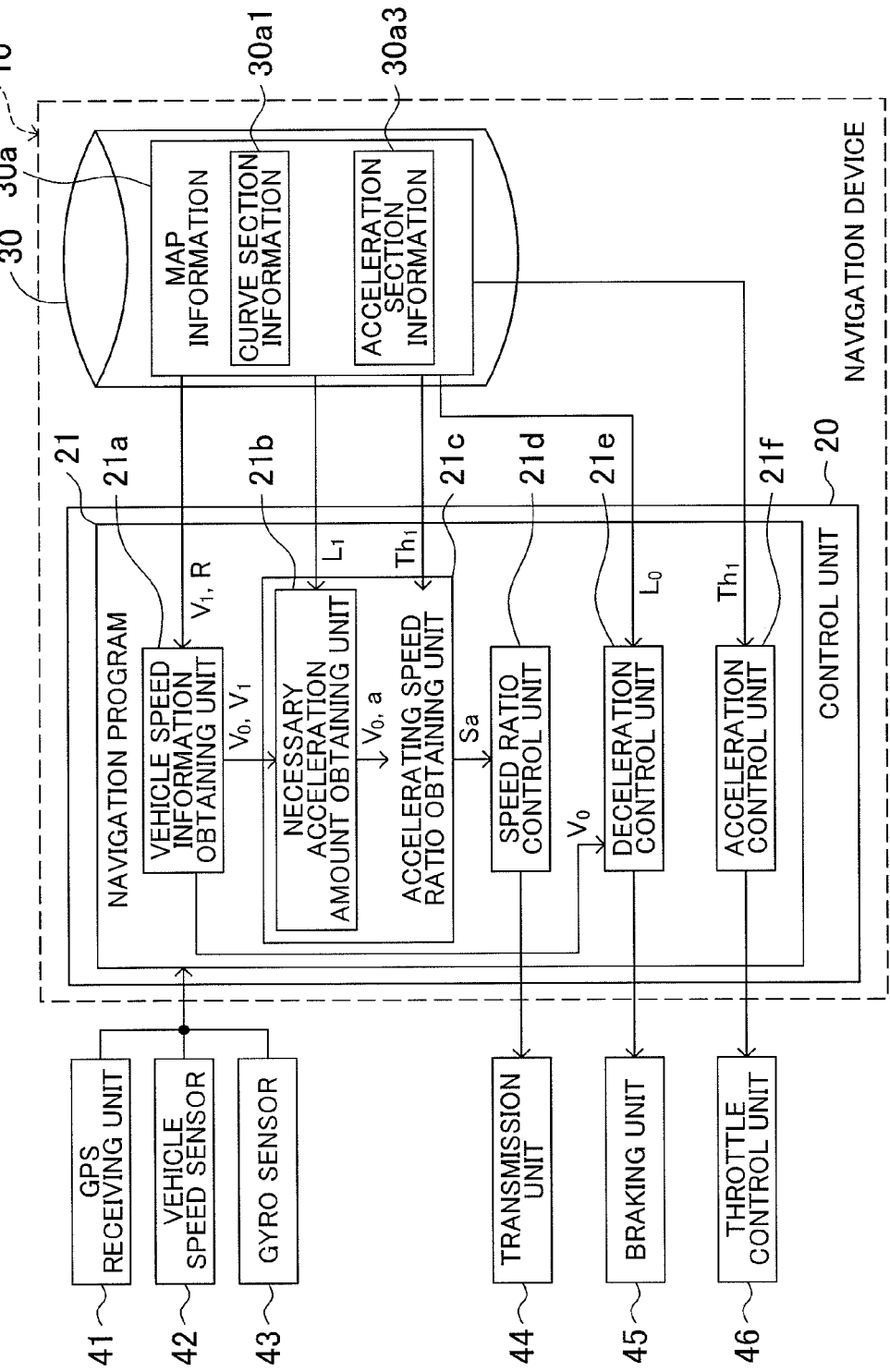
FIG. 1 is a block diagram of a navigation device including a driving support device.

Here, embodiments of the present invention will be described in the following order.
(1) Structure of a navigation device
(2) Driving support processing
   (2-1) Vehicle deceleration processing
   (2-2) Deceleration start determination processing
   (2-3) Deceleration control processing
   (2-4) Vehicle speed limiting processing
   (2-5) Speed ratio selection processing
   (2-6) Speed ratio obtaining processing
(3) Other embodiments (1) Structure of a Navigation Device FIG. 1 is a block diagram showing the structure of a navigation device 10 including a driving support device according to the present invention. The navigation device 10 has a control unit 20 having a CPU, a RAM, a ROM, and so on, and a recording medium 30. The control unit 20 executes programs stored in the recording medium 30 and the ROM. In this embodiment, a navigation program 21 can be implemented as one of the programs, and this navigation program 21 has, as one of its functions, a function to perform deceleration while setting a speed ratio suitable for acceleration in an acceleration section before the vehicle reaches a curve section.

A vehicle (in which the navigation device 10 is mounted) in this embodiment has a GPS receiving unit 41, a vehicle speed sensor 42, a gyro sensor 43, a transmission unit 44, a braking unit 45, and a throttle control unit 46 for achieving functions by the navigation program 21, and the functions by the navigation program 21 are achieved by cooperation of these units and the control unit 20.

The GPS receiving unit 41 receives radio waves from GPS satellites and outputs information for calculating the current position of the vehicle via a not-shown interface. The control unit 20 obtains this signal to acquire the current position of the vehicle. The vehicle speed sensor 42 outputs a signal corresponding to the rotation speed of the wheels of the vehicle. The control unit 20 obtains this signal via the not-shown interface to acquire the speed of the vehicle. The gyro sensor 43 outputs a signal corresponding to the orientation of the vehicle. The control unit 20 obtains this signal via the not-shown interface to acquire the traveling direction of the vehicle. The vehicle speed sensor 42 and the gyro sensor 43 are used for correcting the current position of the vehicle identified by the output signal of the GPS receiving unit 41. Further, the current position of the vehicle is corrected appropriately based on a traveling trace of the vehicle. Various other structures can be employed as a structure for obtaining information indicating operations of the vehicle, and it is possible to employ a structure to identify the current position of the vehicle by a sensor or a camera, a structure to obtain vehicle operation information via a signal from the GPS, the trace of the vehicle on a map, inter-vehicle communication, vehicle-roadside communication, and/or the like.

The transmission unit 44 has a stepped torque converter having a plurality of shift speeds such as six forward speeds in total and one reverse speed in total, and is capable of transmitting the drive force of an engine to the wheels of the vehicle while adjusting the rotation speed with a speed ratio corresponding to each of the shift speeds. The control unit 20 outputs a control signal for switching a shift speed via the not-shown interface, and the transmission unit 44 can obtain this control signal to switch the shift speed. In this embodiment, it is structured such that the speed ratio gets smaller as the shift speed becomes higher from the first forward speed to the sixth forward speed.

The braking unit 45 includes a device to control the pressure of a wheel cylinder which adjusts the degree of deceleration by brakes mounted in the wheels of the vehicle, and the control unit 20 is capable of adjusting the pressure of the wheel cylinder by outputting a control signal to the braking unit 45. Therefore, when the control unit 20 increases the pressure of the wheel cylinder by outputting a control signal to the braking unit 45, the braking force by the brakes increases and the vehicle is decelerated.

The throttle control unit 46 includes a device to control a throttle valve for adjusting the amount of air to be supplied to the engine mounted in the vehicle, and the control unit 20 is capable of adjusting the opening of the throttle valve by outputting a control signal to this throttle control unit 46. Therefore, when the control unit 20 increases the amount of intake air by outputting a control signal to the throttle control unit 46, the number of rotations of the engine increases. The control unit 20 is structured to give a control instruction to the transmission unit 44 and the throttle control unit 46, and thus the control unit 20 can obtain the current speed ratio Sn set by the transmission unit 44 and the current throttle opening Th set by the throttle control unit 46.

The control unit 20 executes the navigation program 21 to carry out a vehicle route search or the like based on output information of the GPS receiving unit 41, map information described later, and the like, and performs route guidance or the like via a not shown display unit and/or speaker. Further, for setting a speed ratio in the transmission unit 44 and controlling acceleration/deceleration using the braking unit 45 and the throttle control unit 46 at this time, the navigation program 21 includes a vehicle speed information obtaining unit 21a, an accelerating speed ratio obtaining unit 21c (including a necessary acceleration amount obtaining unit 21b), a speed ratio control unit 21d, a deceleration control unit 21e, and an acceleration control unit 21f.

Further, the recording medium 30 stores map information 30a for performing guidance by the navigation program 21. The map information 30a includes node data indicating nodes set on a road where the vehicle travels, shape interpolation point data for identifying the shape of a road between nodes, link data indicating coupling of nodes to each other, data indicating features existing on and in the vicinity of a road, and so on, and is used for identifying the current position of the vehicle, performing guidance to a destination, or the like.

Figure 2:
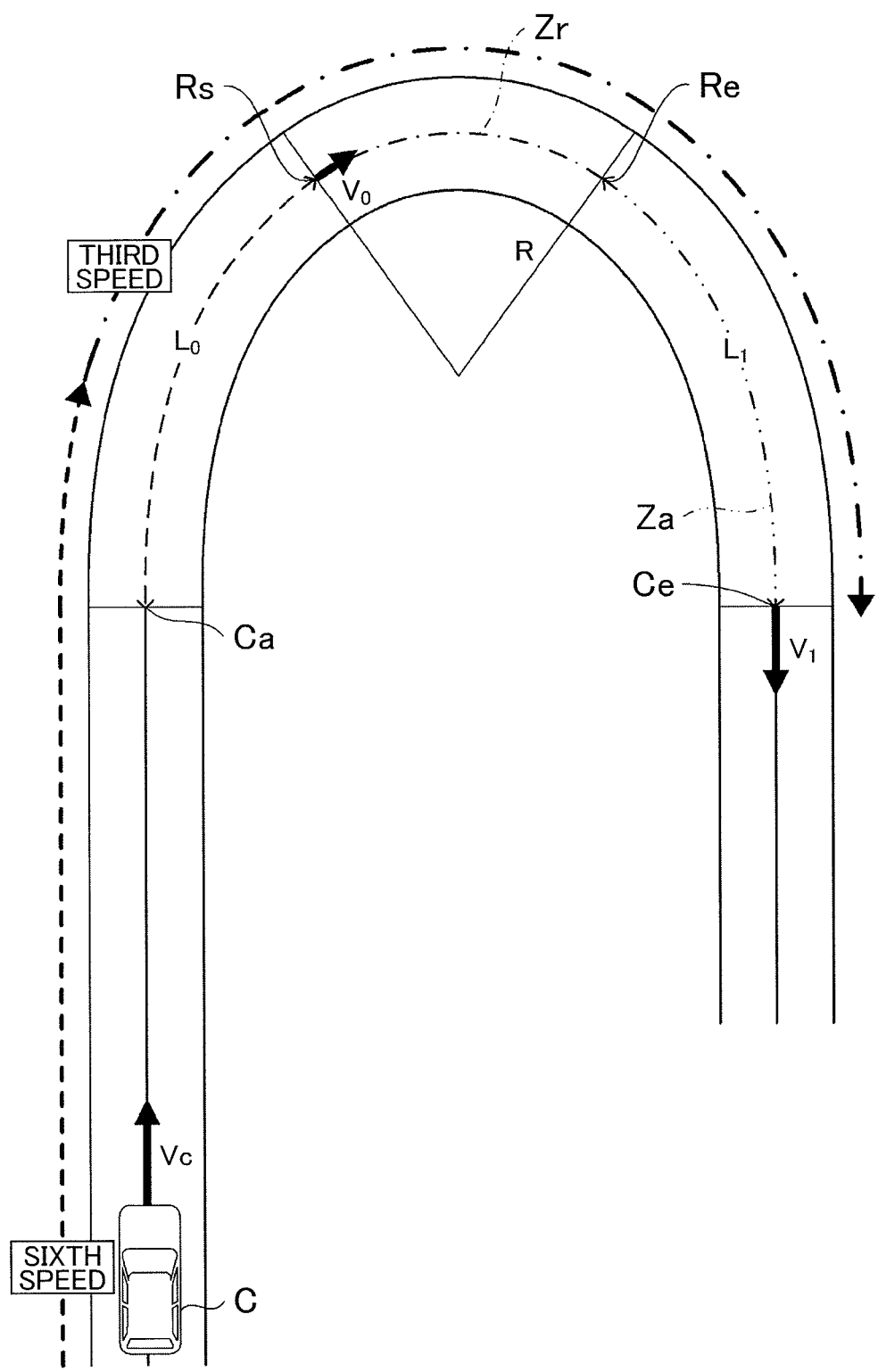
FIG. 2 is a diagram showing an example of a curve section.

In this embodiment, it is structured to perform deceleration control before the vehicle reaches a curve section (a section with a constant radius), and information indicating a curve section and a road before and after this curve section is included in the map information 30a. FIG. 2 is a diagram showing an example of a curve section Zr and showing a state that a vehicle C travels toward the curve section Zr denoted by a thin dot and dash line. In this embodiment, information indicating the start point Rs of this curve section Zr is correlated with node data corresponding to the start point Rs of the curve section Zr, and information indicating the end point Re of the curve section Zr is correlated with node data corresponding to the end point Re of the curve section Zr. Further, shape interpolation data indicating a road shape between the start point Rs and the end point Re indicate a position on an arc of the curve section Zr, and a constant radius R in the curve section Zr and the vehicle speed (target vehicle speed $V_o$) when the vehicle travels a section with the radius R at a constant vehicle speed can be identified based on this shape interpolation data. In this embodiment, information indicating the start point Rs and the end point Re of the curve section Zr and shape interpolation points therebetween is called curve section information 30a1.

Further, in a section before the above-described curve section Zr, the section from the start point Rs of the curve section Zr to a predetermined distance $L_0$ on the side opposite to the curve section is set as a section in which deceleration control may be performed before the vehicle reaches this curve section Zr. In FIG. 2, a thin dashed line indicates the section of the predetermined distance $L_0$. The predetermined distance $L_0$ may be determined by the length of a clothoid section between a straight section and a constant curvature section. In FIG. 2, the start point of the section of the predetermined distance $L_0$ is denoted as a start point Ca. In this embodiment, information indicating the predetermined distance $L_0$ is correlated with the curve section information 30a1.

Furthermore, in a section after the above-described curve section Zr, an acceleration section Za (a section indicated by a two-dot and dash line in FIG. 2, for example, a clothoid section) is set for acceleration toward a predetermined point (the end point Ce of the acceleration section Za) after the vehicle travels the curve section Zr. In this embodiment, information indicating the end point Ce of this acceleration section Za is correlated with node data corresponding to the end point Ce of the acceleration section Za. In this embodiment, the start point of the acceleration section Za matches the end point Re of the curve section Zr, and the shape between the start point Re and the end point Ce of the acceleration section Za is indicated by shape interpolation data.

Further, a distance $L_1$ of the acceleration section Za can be identified based on information indicating positions of the start point Re and the end point Ce of the acceleration section Za. Also, with node data corresponding to the end point Ce of the acceleration section Za, a vehicle speed limit of the location thereof is correlated, and this vehicle speed limit is set as a recommended vehicle speed $V_1$ after the vehicle travels a acceleration section in this embodiment. Moreover, a throttle opening $Th_1$ is determined in advance in the start point Re of the acceleration section Za for performing acceleration control described later, and information indicating this throttle opening $Th_1$ is correlated with the node data corresponding to the end point Ce of the acceleration section Za. In this embodiment, information indicating the start point Re and the end point Ce of the acceleration section Za, the shape interpolation data indicating the road shape therebetween, the recommended vehicle speed $V_1$, and the throttle opening $Th_1$ is called acceleration section information $30a3$.

The vehicle speed information obtaining unit $21a$ is a module obtaining the target vehicle speed $V_0$ when the vehicle travels the curve section Zr and the recommended vehicle speed $V_1$ after the vehicle travels the curve section Zr, and identifies the vehicle speed information referring to the map information $30a$. That is, the control unit 20 refers to the curve section information $30a1$ to identify the radius R of the curve section Zr by processing of the vehicle speed information obtaining unit $21a$, and obtains the vehicle speed for traveling the section of the radius R at a constant vehicle speed. The obtained vehicle speed is set as the target vehicle speed $V_0$. For example, a vehicle speed $(Gt \cdot R)^{1/2}$ for traveling at a constant vehicle speed with a lateral acceleration G (0.2 G for example) set in advance is obtained as the target vehicle speed $V_0$. Further, the recommended vehicle speed $V_1$ is obtained referring to the acceleration section information $30a3$.

The necessary acceleration amount obtaining unit $21b$ is a module for obtaining a necessary acceleration amount for accelerating the vehicle from the target vehicle speed $V_0$ to the recommended vehicle speed $V_1$. The control unit 20 identifies the distance $L_1$ of the acceleration section based on the acceleration section information $30a3$ by processing of the necessary acceleration amount obtaining unit $21b$, and obtains a necessary acceleration a for accelerating the vehicle from the target vehicle speed $V_0$ to the recommended vehicle speed $V_1$ at the distance $L_1$. Specifically, the length between the start point Re and the end point Ce along a road shape is obtained as the distance $L_1$ from the information indicating positions of the start point Re and the end point Ce of the acceleration section Za and a shape interpolation point therebetween. Then, assuming uniform acceleration motion, for example, the necessary acceleration a for changing the target vehicle speed $V_0$ to the recommended vehicle speed $V_1$ at this distance $L_1$ is obtained as $a=(V_1^2-V_0^2)/(2L_1)$, or the like.

The accelerating speed ratio obtaining unit $21c$ is a module obtaining an accelerating speed ratio Sa (Sa is one of 1 to 6 (corresponding to the above-described first forward speed to sixth forward speed)) for allowing the vehicle to travel with an acceleration equal to or larger than the necessary acceleration a. The control unit 20 obtains the throttle opening $Th_1$ referring to the acceleration section information $30a3$ by processing of the accelerating speed ratio obtaining unit $21c$, and determines the speed ratio based on this throttle opening $Th_1$, the necessary acceleration a, and the target vehicle speed $V_0$. In this embodiment, in a state that the speed of the vehicle is at the target vehicle speed $V_0$ and the vehicle travels with the engine speed corresponding to the throttle opening $Th_1$, the speed ratio that minimizes fuel consumption is set as the accelerating speed ratio Sa out of speed ratios with which an acceleration equal to or higher than the necessary acceleration a can be generated.

With this structure, the vehicle can accelerate from the target vehicle speed $V_0$ to the recommended vehicle speed $V_1$ using the fuel efficiently. For example, it is possible to employ a structure to prepare a fuel consumption map correlated with the engine speed, the throttle opening $Th_1$, or the like in advance, and select the speed ratio based on this fuel consumption map. Further, although the engine speed corresponding to the throttle opening $Th_1$ is assumed here, the rotation speed may of course be determined based on statistic values or the like.

The speed ratio control unit $21d$ is a module setting the speed ratio of the vehicle to the accelerating speed ratio Sa before the vehicle reaches the start point Rs of the curve section Zr. The control unit 20 outputs to the transmission unit 44 a control signal for changing the speed ratio to the accelerating speed ratio Sa at a predetermined timing according to a processing procedure described later by processing of the speed ratio control unit $21d$. The transmission unit 44 switches the speed ratio to the accelerating speed ratio Sa according to this control signal.

The deceleration control unit $21e$ is a module decelerating the vehicle to the target vehicle speed $V_0$ before the vehicle reaches the curve section Zr. The control unit 20 performs feedback control so that the vehicle speed becomes the target vehicle speed $V_0$ at the start point Rs of the curve section Zr by processing of the deceleration control unit $21e$. Specifically, the target vehicle speed $V_0$ is obtained, and the length between the current position of the vehicle and the end point Rs along the road shape is obtained as a distance Lc from the information indicating positions of the current position of the vehicle, the start point Rs, and the shape interpolation point therebetween referring to the curve section information $30a1$.

Then, assuming uniform acceleration motion, for example, a necessary deceleration Gr (a negative acceleration given that the traveling direction of the vehicle is positive) for changing the current vehicle speed Vc of the vehicle to the target vehicle speed $V_0$ at the distance Lc is obtained as $Gr=(V_0^2-Vc^2)/(2Lc)$. Moreover, in this embodiment, the necessary deceleration Gr is obtained continuously, and deceleration control is started when this necessary deceleration Gr surpasses a predetermined threshold (LimG_h or LimG_L described later). Specifically, a deceleration Ge by engine braking is obtained based on the current speed ratio Sn set by the transmission unit 44 and the engine speed with the current throttle opening Th adjusted by the throttle control unit 46. Then the control unit 20 outputs to the braking unit 45 a control signal for causing the brakes to generate the deceleration corresponding to the difference (Gr−Ge) between the necessary deceleration Gr and this deceleration Ge. As a result, the braking unit 45 operates the brakes so as to supplement the difference (Gr−Ge) between the necessary deceleration Gr and this deceleration Ge.

In this embodiment, the speed ratio is switched to the accelerating speed ratio Sa in the middle of performing a deceleration operation before the vehicle reaches a curve section. In doing so, normally, it becomes a speed ratio with larger torque by switching the speed ratio. Accordingly, it is possible to supplement the deceleration before the vehicle reaches the curve section by changing the speed ratio to the accelerating speed ratio Sa.

Moreover, the acceleration control unit 21*f* is a module for controlling acceleration after the vehicle travels the curve section Zr. The control unit 20 controls the throttle opening Th so that the vehicle speed is changed from the target vehicle speed $V_0$ to the recommended vehicle speed $V_1$ in the acceleration section Za from the end point Re of the curve section Zr to the distance $L_1$ by processing of the acceleration control unit 21*f*. Specifically, in a state that the speed ratio is kept to the accelerating speed ratio Sa, an output signal is outputted to the throttle control unit 46 to set the throttle opening to $Th_1$, and thereafter the throttle opening is adjusted appropriately so that the acceleration is performed with the necessary acceleration a.

With the above structure, since the accelerating speed ratio Sa is set in the stage that the vehicle travels a road before a curve section, the accelerating speed ratio Sa is suitable for accelerating the vehicle to the recommended vehicle speed $V_1$ in the stage of traveling the acceleration section Za, thereby inhibiting unnecessary shifting in this acceleration section Za. Accordingly, a change in the engine speed accompanying this unnecessary shifting is inhibited, and decrease in traveling stability during acceleration can be inhibited, thereby allowing smooth acceleration. Further, when deceleration is performed by selecting the speed ratio by which the deceleration closest to the necessary deceleration Gr can be obtained, it is possible to decelerate by effectively using the deceleration by engine braking, but the shock applied to the vehicle while shifting becomes relatively large due to the engine braking functioning effectively. However, in the present invention, the accelerating speed ratio Sa is determined focusing on the necessary acceleration a while accelerating the vehicle rather than a deceleration while decelerating the vehicle, and thus the shock applied to the vehicle while decelerating the vehicle can be suppressed relatively low.

(2) Driving Support Processing

Figure 3:
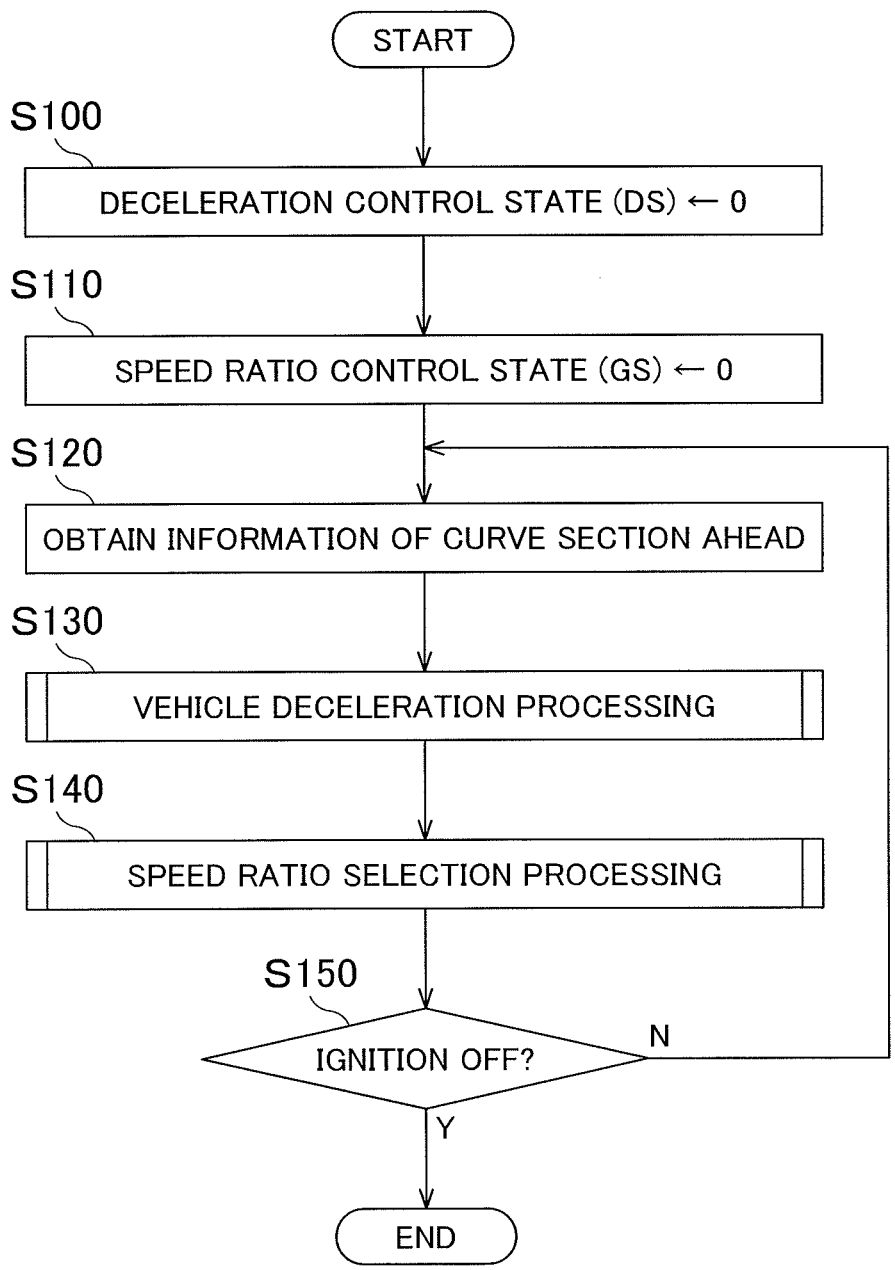
FIG. 3 is a flowchart of driving support processing.

Next, driving support processing implemented by the navigation device 10 in the above structure will be described. When the navigation program 21 is executed by the navigation device 10, the units included in the navigation program 21 perform processing shown in FIG. 3. In this embodiment, three different states of control (called a deceleration control state DS) with respect to deceleration control are provided, and three different states of control (called a speed ratio control state GS) with respect to speed ratio control are provided. The control unit 20 initializes variables for specifying the deceleration control state DS and the speed ratio control state GS to "0" (steps S100, S110). In this embodiment, a state that vehicle speed control is not performed is DS=0, a state that the vehicle speed is decelerated to the target vehicle speed $V_0$ is DS=1, and a state that the vehicle speed is kept in the curve section is DS=2. Further, a state that control of speed ratio is not performed is GS=0, a state that calculation processing of speed ratio is performed is GS=1, and a state that switching processing of speed ratio is performed is GS=2.

When the deceleration control state DS and the speed ratio control state GS are initialized, the control unit 20 obtains information of a curve section existing ahead of the vehicle (step S120). Specifically, the control unit 20 identifies the current position of the vehicle based on the output signal of the GPS receiving unit 41 or the like, and determines whether a curve section exists or not in a predetermined range ahead of this current position referring to the map information 30*a*. Then, when a curve section exists, the curve section information 30*a*1 and the acceleration section information 30*a*3 related to this curve section are obtained. Moreover, the control unit 20 performs vehicle deceleration processing (step S130) and speed ratio selection processing (step S140) and obtains an output signal of a not-shown ignition switch, so as to determine whether the ignition is turned off or not (step S150). Then processing of step S120 and thereafter is repeated until it is determined that the ignition is turned off.

(2-1) Vehicle Deceleration Processing

Figure 4:
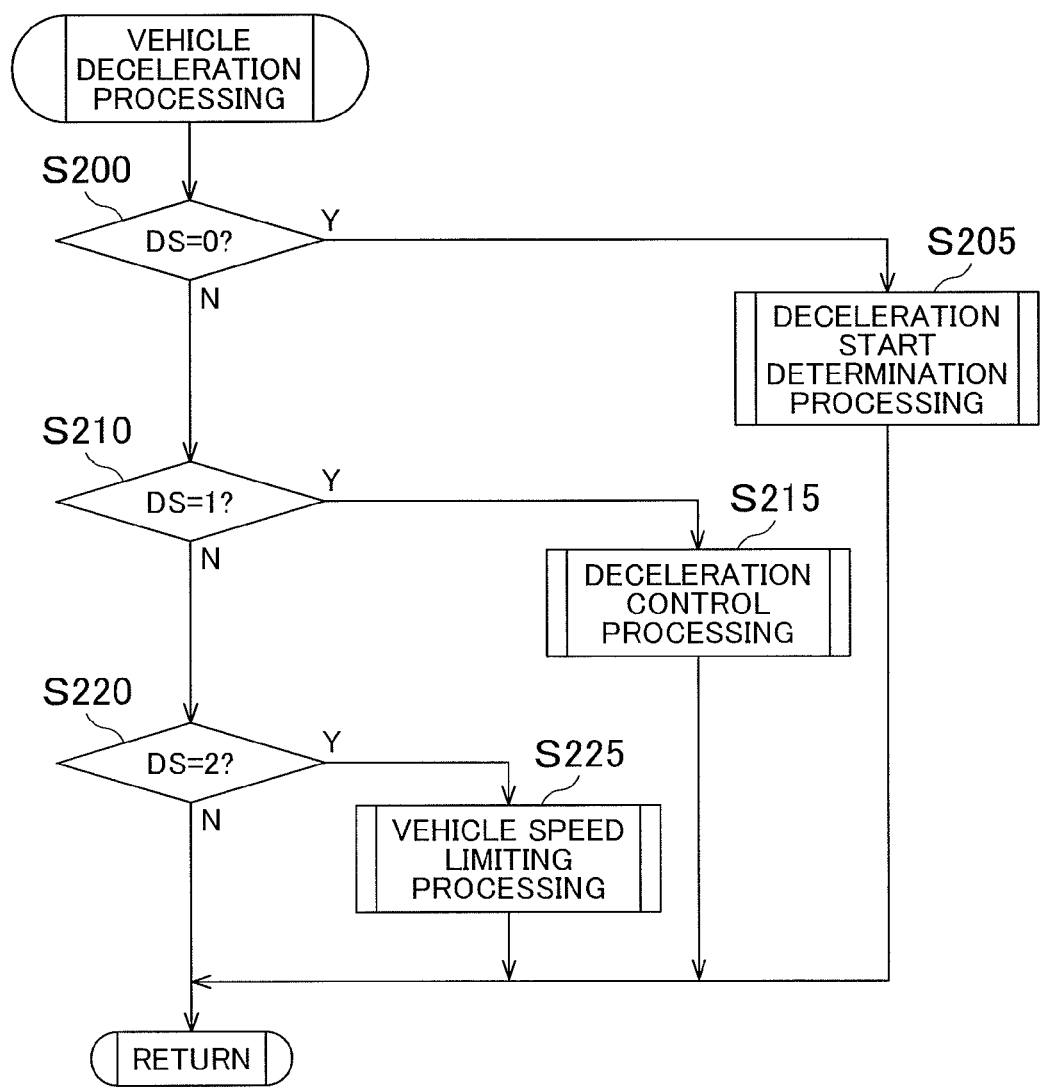
FIG. 4 is a flowchart of vehicle deceleration processing.

FIG. 4 is a flowchart showing the vehicle deceleration processing in step S130. In the vehicle deceleration processing shown in FIG. 4, the control unit 20 determines whether the deceleration control state DS is "0" or not (step S200), whether it is "1" or not (step S210), and whether it is "2" or not (step S220). When it is determined in step S200 that DS=0, deceleration start determination processing is performed (step S205). When it is determined in step S210 that DS=1, deceleration control processing is performed (step S215). When it is determined in step S220 that DS=2, vehicle speed limiting processing (step S225) is performed. When other determination results are obtained and after step S205, S215, or S225 is performed, the control unit returns to FIG. 3 to repeat the processing.

(2-2) Deceleration Start Determination Processing

Figure 5:
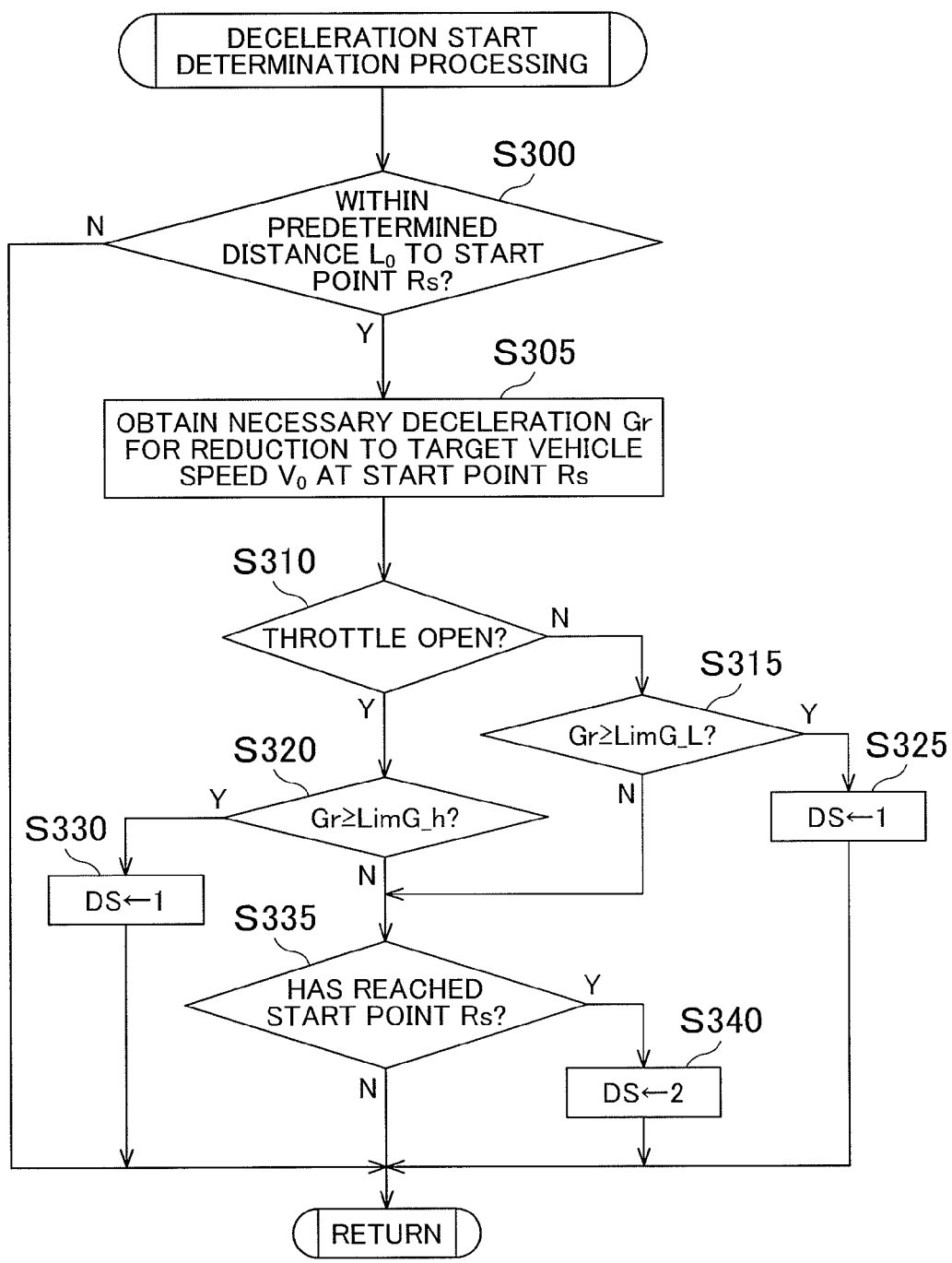
FIG. 5 is a flowchart of deceleration start determination processing.

FIG. 5 is a flowchart showing the deceleration start determination processing in step S205. In this deceleration start determination processing, processing to set the deceleration control state DS to "1" or "2" based on a predetermined condition is performed. For this purpose, the control unit 20 first determines whether or not the vehicle has reached a position within the predetermined distance $L_0$ to the start point Rs of the curve section Zr by processing of the deceleration control unit 21*e* (step S300). That is, it is determined whether the vehicle has passed the start point Ca or not. Specifically, the control unit 20 obtains the current position of the vehicle based on the output signal of the GPS receiving unit 41 or the like, obtains the position of the start point Rs of the curve section Zr referring to the curve section information 30*a*1, and determines whether or not the distance from the current position of the vehicle to the start point Rs is equal to or shorter than the predetermined distance $L_0$ in the process that the current position of the vehicle approaches the position of the start point Rs. When it is not determined in step S300 that the vehicle has reached the position within the predetermined distance $L_0$ to the start point Rs of the curve section Zr, processing of step S305 and thereafter is skipped and the processing returns to processing shown in FIG. 4.

When it is determined in step S300 that the vehicle has reached the position within the predetermined distance $L_0$ to the start point Rs of the curve section Zr, the control unit 20 obtains the necessary deceleration Gr for reducing the speed of the vehicle to the target vehicle speed $V_0$ at the start point Rs of the curve section Zr by processing of the vehicle speed information obtaining unit 21*a* and the deceleration control unit 21*e* (step S305). That is, the control unit 20 identifies the radius R of the curve section Zr based on the curve section information 30*a*1 and obtains as the target vehicle speed $V_0$ the vehicle speed when the vehicle travels the curve with this radius R at a constant vehicle speed. Further, the above-described distance Lc is obtained from the current position of the vehicle identified based on the output signal of the GPS receiving unit 41 or the like, the start point Rs of the curve section Zr identified based on the curve section information 30*a*1, and the information indicating the position of a shape interpolation point between the current position and the start point Rs. Then the current vehicle speed Vc is identified based on the output information of the vehicle speed sensor 42 to obtain the necessary deceleration Gr as Gr=$(V_0^2-Vc^2)/(2Lc)$.

Next, the control unit 20 determines whether the throttle valve is in an open state (accelerator-on state) or not (step S310). Specifically, the control unit 20 obtains the current throttle opening Th by processing of the deceleration control unit 21*e*, and determines whether or not the throttle valve is not closed, that is, in an open state. When it is not determined in step S310 that the throttle valve is in an open state (accelerator-off state), the control unit 20 determines whether or not the necessary deceleration Gr is equal to or larger than the threshold LimG_L by processing of the deceleration control unit 21*e* (step S315). Further, when it is determined in step S310 that the throttle valve is in an open state (accelerator-on state), the control unit 20 determines whether or not the necessary deceleration Gr is equal to or larger than the threshold LimG_h by processing of the deceleration control unit 21*e* (step S320).

When it is determined in steps S315, S320 that the necessary deceleration Gr is equal to or larger than the respective thresholds, the control unit 20 sets the deceleration control state DS to "1" by processing of the deceleration control unit 21*e* (steps S325, S330). Specifically, when the vehicle approaches the curve section Zr without decelerating, the necessary deceleration Gr for reducing the vehicle speed to the target vehicle speed $V_0$ becomes large as the vehicle approaches the curve section Zr, and the necessary deceleration Gr surpasses the threshold at any timing. Thus, the deceleration control state DS is set to "1" so that the deceleration control is performed after surpassing the threshold. In this embodiment, on the assumption that the timing to start deceleration would differ depending on the state of the throttle valve, the threshold LimG_h, when the throttle valve is in an open state and the threshold LimG_L when the throttle valve is in a close state are set to different values, and are set so as to satisfy LimG_h>LimG_L.

On the other hand, when it is not determined in steps S315, S320 that the necessary deceleration Gr is equal to or larger than the respective thresholds, the control unit 20 determines whether the vehicle has reached the start point Rs of the curve section Zr or not by processing of the deceleration control unit 21*e* (step S335). That is, the current position of the vehicle is obtained based on the output signal of the GPS receiving unit 41 or the like, the position of the start point Rs of the curve section Zr is obtained referring to the curve section information 30*a*1, and it is determined whether or not the current position of the vehicle is closer to the curve section Zr than the position of the start point Rs. When it is determined in step S335 that the vehicle has reached the start point Rs of the curve section Zr, the deceleration control state DS is set to "2". That is, when the vehicle has reached the curve section Zr while the necessary deceleration Gr is not surpassing the threshold, the deceleration control state DS is set to "2". When it is not determined in step S335 that the vehicle has reached the start point Rs of the curve section Zr, the control unit returns to the processing shown in FIG. 4.

(2-3) Deceleration Control Processing

Figure 6:
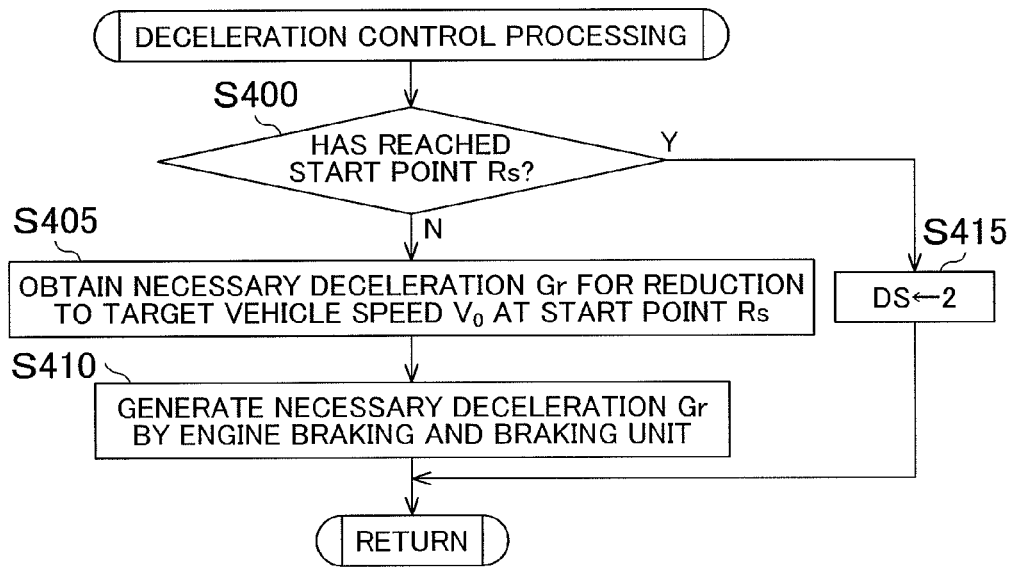
FIG. 6 is a flowchart of deceleration control processing.

FIG. 6 is a flowchart showing deceleration control processing in step S215. In this deceleration control processing, processing for decelerating the vehicle to the target vehicle speed $V_0$ is performed. For this purpose, the control unit 20 first determines whether the vehicle has reached the start point Rs of the curve section Zr or not by processing of the deceleration control unit 21*e* (step S400). Specifically, the control unit 20 obtains the current position of the vehicle based on the output signal of the GPS receiving unit 41 or the like, obtains the position of the start point Rs of the curve section Zr referring to the curve section information 30*a*1, and determines whether or not the current position of the vehicle is closer to the curve section Zr than the position of the start point Rs.

When it is not determined in step S400 that the vehicle has reached the start point Rs of the curve section Zr, the control unit 20 obtains the necessary deceleration Gr for reducing the speed of the vehicle to the target vehicle speed $V_0$ at the start point Rs of the curve section Zr by processing of the vehicle speed information obtaining unit 21*a* and the deceleration control unit 21*e* (step S405). This processing is similar to the above-described processing of step S305.

Then the control unit 20 generates the necessary deceleration Gr by engine braking and the braking unit (step S410). Specifically, the control unit 20 obtains the current speed ratio Sn and the current throttle opening Th by processing of the deceleration control unit 21*e*, and obtains the deceleration Ge by engine braking based on the engine speed with the speed ratio Sn and the throttle opening Th. Then the control unit 20 outputs to the braking unit 45 a control signal for generating the deceleration corresponding to (Gr−Ge) by the brakes.

Consequently, in the braking unit 45, the brakes are operated to supplement the difference (Gr−Ge) between the necessary deceleration Gr and the deceleration Ge, and the deceleration of the vehicle is reduced to the necessary deceleration Gr. Since the necessary deceleration Gr functions to reduce the current vehicle speed Vc of the vehicle to the target vehicle speed $V_0$ at the distance Lc as described above, the speed of the vehicle can be converged to the target vehicle speed $V_0$ by repeating the control as above. The speed ratio in the above deceleration control is determined based on the necessary acceleration a rather than the necessary deceleration Gr, and the speed ratio of the vehicle is switched to the accelerating speed ratio Sa by processing, which will be described later, before the vehicle reaches the curve section.

When it is determined in step S400 that the vehicle has reached the start point Rs of the curve section Zr, the control unit 20 sets the deceleration control state DS to "2" (step S415). Specifically, the deceleration control state DS is set to "2" for performing processing to keep the vehicle speed rather than decelerating when the vehicle reaches the curve section Zr. After steps S410, S415, the control unit returns to the processing shown in FIG. 4.

(2-4) Vehicle Speed Limiting Processing

Figure 7:
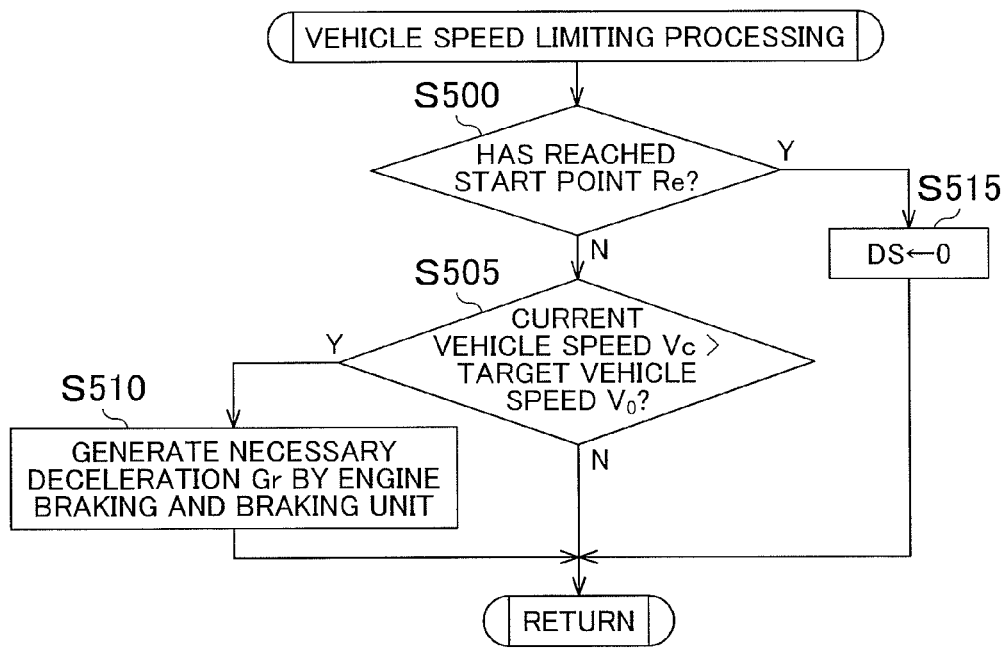
FIG. 7 is a flowchart of vehicle speed limiting processing.

FIG. 7 is a flowchart showing the vehicle speed limiting processing in step S225. In this vehicle speed limiting processing, processing to keep the speed of the vehicle at the target vehicle speed $V_0$ is performed. For this purpose, the control unit 20 first determines whether or not the vehicle has reached the end point Re of the curve section Zr (start point of the acceleration section Za) by processing of the deceleration control unit 21*e* (step S500). Specifically, the control unit 20 obtains the current position of the vehicle based on the output signal of the GPS receiving unit 41 or the like, obtains the position of the end point Re of the curve section Zr referring to the curve section information 30*a*1, and determines whether or not the current position of the vehicle is closer to the acceleration section Za than the position of the end point Re.

When it is not determined in step S500 that the vehicle has reached the end point Re of the curve section Zr, the control unit 20 identifies the current vehicle speed Vc based on the output information of the vehicle speed sensor 42 by processing of the deceleration control unit 21*e*, and determines whether the current vehicle speed Vc surpassed the target vehicle speed $V_0$ as a threshold or not (step S505). When it is determined in step S505 that the vehicle speed Vc has surpassed the target vehicle speed $V_0$, the control unit 20 generates the necessary deceleration Gr by engine braking and the braking unit (step S510). Processing of this step S510 is similar to above-described step S410.

On the other hand, when it is determined in step S500 that the vehicle has reached the end point Re of the curve section Zr, the control unit 20 sets the deceleration control state DS to "0" tso as to end the deceleration control (step S515). After steps S510, S515 and when it is not determined in step S505 that the current vehicle speed Vc has surpassed the target vehicle speed $V_0$, the control unit returns to the processing shown in FIG. 4.

(2-5) Speed Ratio Selection Processing

Figure 8:
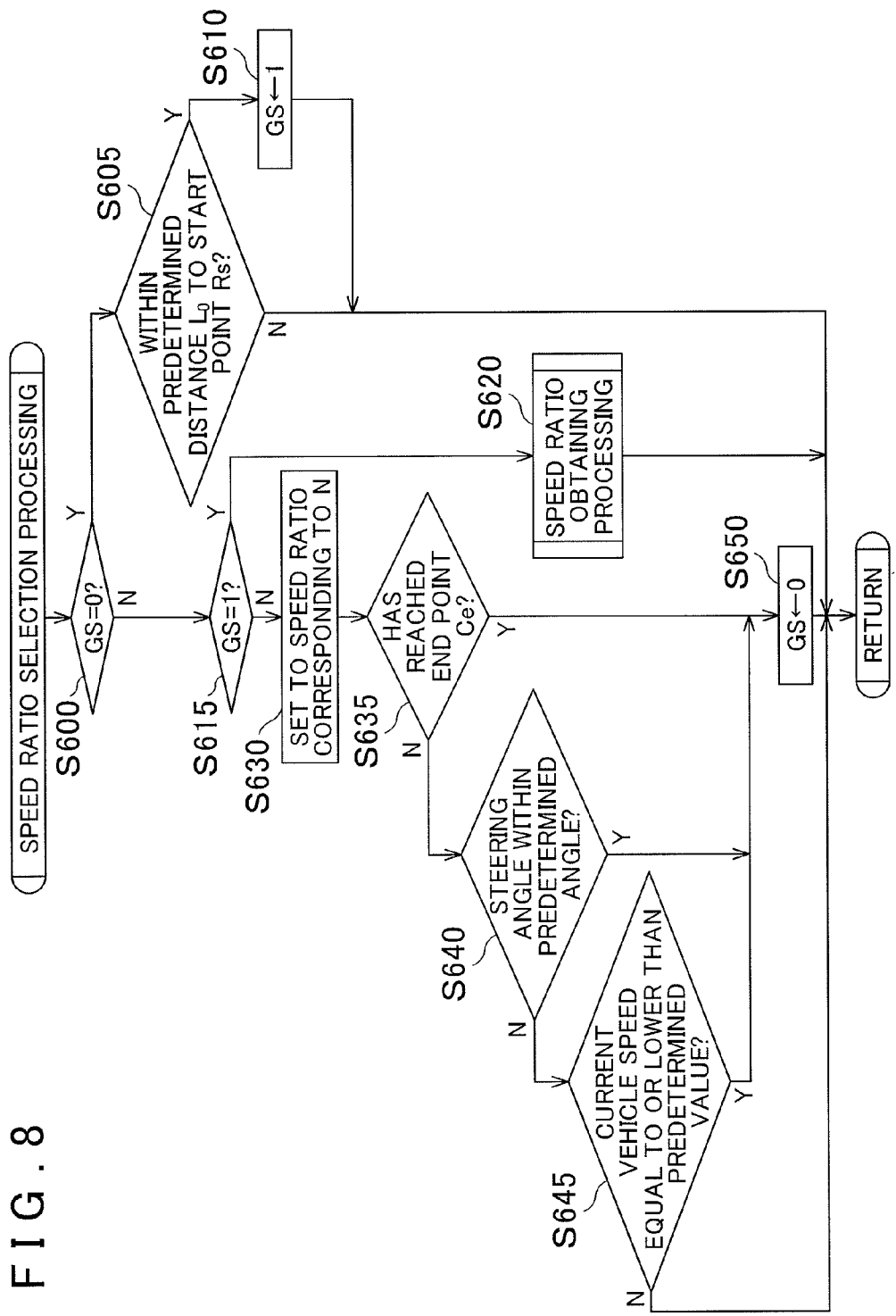
FIG. 8 is a flowchart of speed ratio selection processing.

FIG. 8 is a flowchart showing the speed ratio selection processing in step S140. In the speed ratio selection processing, the speed ratio control state GS is identified, the accelerating speed ratio Sa is obtained, and processing to set the speed ratio is performed. In this speed ratio selection processing, the control unit 20 determines whether the speed ratio control state GS is "0" or not (step S600) and whether it is "1" or not (step S615). When it is determined in step S600 that GS=0, processing to set the speed ratio control state GS to "1" is performed (steps S605, S610), and when it is determined in step S615 that GS=1, the speed ratio obtaining processing is performed (step S620).

In step S605, the control unit 20 determines whether or not the vehicle has reached a position within the predetermined distance $L_0$ to the start point Rs of the curve section Zr by processing of the deceleration control unit 21e. When it is not determined in step S605 that the vehicle has reached the position within the predetermined distance $L_0$ to the start point Rs of the curve section Zr, step S610 is skipped and the control unit returns to the processing shown in FIG. 3. On the other hand, when it is determined that the vehicle has reached the position within the predetermined distance $L_0$ to the start point Rs of the curve section Zr, the speed ratio control state GS is set to "1". That is, GS=1 as a state for obtaining the accelerating speed ratio Sa is set before the vehicle reaches a curve section.

The speed ratio obtaining processing of step S620 will be described in detail later. In this speed ratio obtaining processing, a value indicating the shift speed corresponding to the accelerating speed ratio Sa is assigned to the variable N indicating the shift speed corresponding to the speed ratio, and set the speed ratio control state GS to "2". In FIG. 8, when it is not determined in step S600 that GS=0 and it is not determined in step S615 that GS=1, that is, when the speed ratio control state GS is "2", the control unit 20 performs setting so that the vehicle travels with the speed ratio corresponding to the variable N by processing of the speed ratio control unit 21d (step S630). Here, the value indicating the shift speed corresponding to the accelerating speed ratio Sa is assigned to the variable N, and the control unit 20 outputs to the transmission unit 44 a control signal so as to perform shifting to the shift speed indicated by the variable N.

Next, the control unit 20 determines whether or not to keep the state that the speed ratio is set to the accelerating speed ratio Sa by processing of the speed ratio control unit 21d. Specifically, it is determined whether the end point Ce of the acceleration section Za is reached or not (step S635), it is determined whether a steering angle is within a predetermined angle or not (step S640), and/or it is determined whether or not the current vehicle speed is equal to or lower than the predetermined value (step S645). Further, when it is determined in step S635 that the end point Ce is reached, when it is determined in step S640 that the steering angle is within the predetermined angle, or when it is determined in step S645 that the current vehicle speed is equal to or lower than the predetermined value, the control unit 20 sets the speed ratio control state GS to "0" (step S650). On the other hand, step S650 is skipped in other cases.

In this embodiment, when the speed ratio control state GS is "0", it is possible to release the state that the speed ratio is set to the accelerating speed ratio Sa, and perform shifting according to the operation of the driver. Further, in step S635 the control unit 20 obtains the current position of the vehicle based on the output signal of the GPS receiving unit 41 or the like, obtains the position of the end point Ce of the acceleration section Za referring to the acceleration section information 30a3, and determines whether or not the current position of the vehicle is at or beyond the position of the end point Ce. Therefore, before the vehicle passes the end point Ce, it is assumed that the speed ratio of the vehicle is set to the accelerating speed ratio Sa and thus acceleration is allowed. After the vehicle passes the end point Ce, it becomes possible to set the speed ratio according to the operation of the driver.

Further, in step S640 the control unit 20 obtains output information of a not-shown steering angle sensor, and identifies the steering angle based on the output information. Then, by comparing the steering angle with a predetermined steering angle, it is determined whether the steering angle is within the predetermined angle or not. Here, when the steering angle is within the predetermined angle, it is assumed that the speed ratio is set to the accelerating speed ratio Sa and thus acceleration is allowed. When the steering angle is not within the predetermined angle, it becomes possible to set the speed ratio according to the operation of the driver.

Moreover, in step S645, the control unit 20 identifies the current speed of the vehicle based on the output information of the vehicle speed sensor 42, and determines whether or not the current vehicle speed is equal to or lower than a predetermined value. Here, when the current vehicle speed is equal to or lower than the predetermined value, it is assumed that the speed ratio is set to the accelerating speed ratio Sa and thus acceleration is allowed. When the current vehicle speed is not equal to or lower than the predetermined value, it becomes possible to set the speed ratio according to the operation of the driver.

(2-6) Speed Ratio Obtaining Processing

Figure 9:
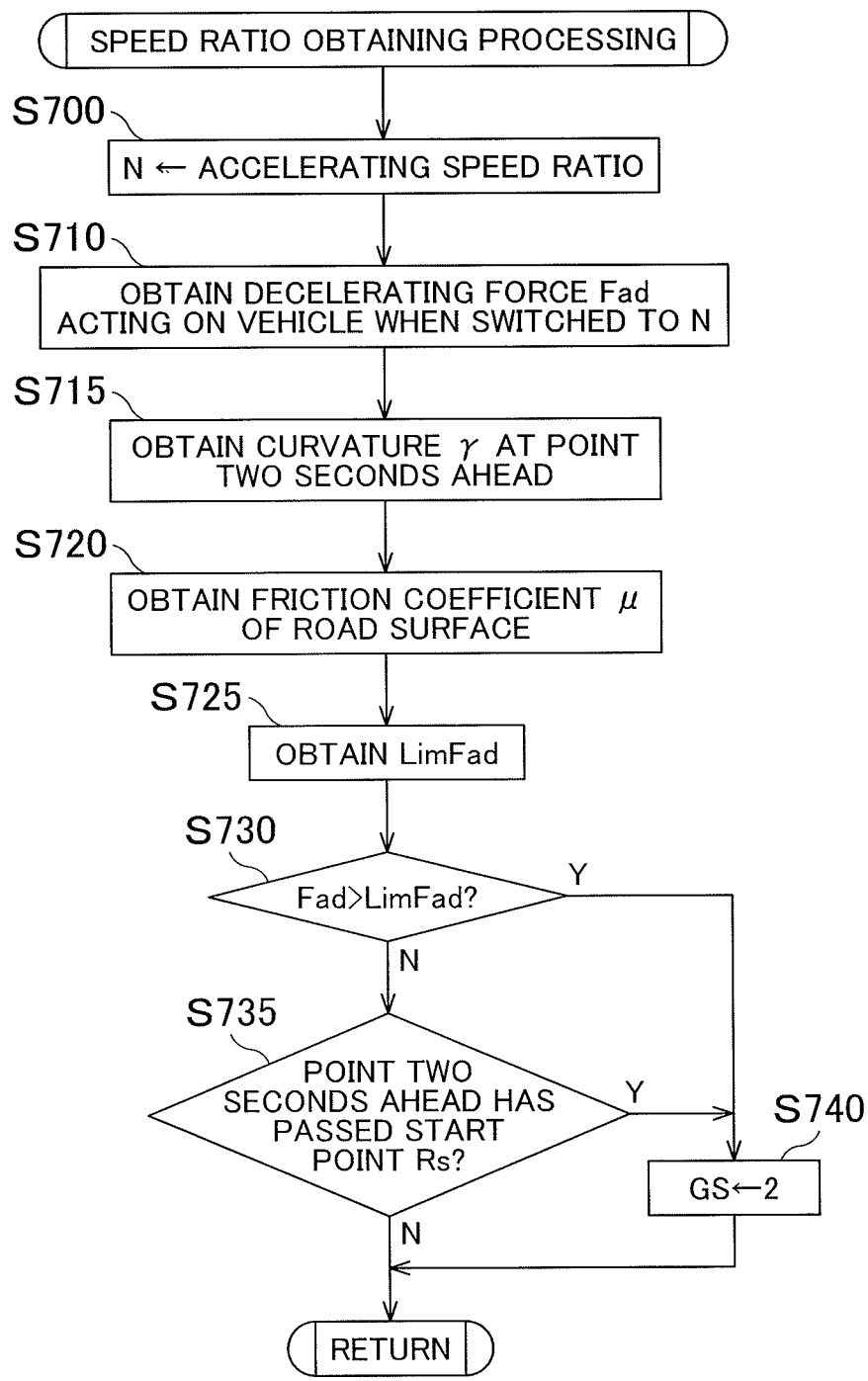
FIG. 9 is a flowchart of speed ratio obtaining processing.

FIG. 9 is a flowchart showing the speed ratio obtaining processing in step S620. In this speed ratio obtaining processing, the shift speed corresponding to the accelerating speed ratio Sa is assigned to N in order to set the state (GS=2) for switching to the shift speed corresponding to the accelerating speed ratio Sa.

In this speed ratio obtaining processing, the control unit 20 assigns the shift speed corresponding to the accelerating speed ratio Sa to N (step S700). That is, the control unit 20 calculates the accelerating speed ratio Sa by processing of the vehicle speed information obtaining unit 21a, the necessary acceleration amount obtaining unit 21b, and the accelerating speed ratio obtaining unit 21c. Specifically, the control unit 20 identifies the target vehicle speed $V_0$ based on the radius R of the curve section by processing of the vehicle speed information obtaining unit 21a, and obtains the recommended vehicle speed $V_1$ referring to the acceleration section information 30a3.

Further, the control unit 20 identifies the distance $L_1$ between acceleration sections based on the acceleration section information 30a3 by processing of the necessary acceleration amount obtaining unit 21b, and obtains the necessary acceleration $a = (V_1^2 - V_0^2)/(2L_1)$. Moreover, the control unit 20 obtains the throttle opening $Th_1$ at the start point Re of the acceleration section Za referring to the acceleration section information 30a3 by processing of the accelerating speed ratio obtaining unit 21c, and determines the speed ratio based on the necessary acceleration a and the target vehicle speed $V_0$. In this embodiment, when the speed of the vehicle is the target vehicle speed $V_0$ with the throttle opening $Th_1$, torques $Tr_1$ to $Tr_6$ (1 to 6 correspond to respective speed ratios) outputted with the respective speed ratios are compared with the torque Tra corresponding to the necessary acceleration a.

For this purpose, the torque Tra corresponding to the necessary acceleration speed ratio is obtained by, for example, acceleration×vehicle weight×radius of tire/differential speed ratio. On the other hand, the engine speed (rpm) achieved by each speed ratio at the target vehicle speed $V_0$ is obtained by, for example, the target vehicle speed $V_0 \times 1000/3600/(2\pi \times$ radius of tire)×differential speed ratio×60×speed ratio× torque converter slip ratio. Consequently, engine speeds $Re_1$ to $Re_6$ at the target vehicle speed $V_0$ corresponding to the respective speed ratios 1 to 6 (shift speeds 6 to 1) are obtained. Further, torques $Tr_1$ to $Tr_6$ which can be outputted with the throttle opening $Th_1$ at the engine speeds $Re_1$ to $Re_6$ are obtained. As the torques $Tr_1$ to $Tr_6$, for example, the torques $Tr_1$ to $Tr_6$ corresponding to the engine speeds $Re_1$ to $Re_6$ may be obtained based on a torque characteristic map in which the throttle opening $Th_1$ is correlated with the engine speed and torque for each speed ratio.

As described above, once the torque Tra corresponding to the necessary acceleration a and the torques $Tr_1$ to $Tr_6$ outputted with the respective speed ratios are obtained, the speed ratio that minimizes fuel consumption is selected as the accelerating speed ratio Sa among the speed ratios with which the torque equal to or larger than the torque Tra can be generated (that is, an acceleration equal to or larger than the necessary acceleration a can be generated). As a result, a speed ratio, which is capable of changing the speed of the vehicle to the recommended vehicle speed $V_1$ when the vehicle accelerates with the necessary acceleration a, and is capable of minimizing fuel consumption, serves as the accelerating speed ratio Sa. Once the accelerating speed ratio Sa is obtained, a value indicating the shift speed corresponding to this accelerating speed ratio Sa is assigned to the variable N.

Furthermore, in step S710 and thereafter, the control unit 20 performs processing to set the speed ratio control state GS to "2" at a timing to prevent decrease in traveling stability of the vehicle so as to set the speed ratio. In this processing, the control unit 20 calculates a decelerating force Fad acting on the vehicle when the shift speed of the vehicle is set to the shift speed corresponding to the accelerating speed ratio Sa (step S710). Here, the decelerating force Fad indicates a decelerating force (force toward the rear side of the vehicle) acting on the vehicle when the vehicle travels at the current vehicle speed and at the current engine speed in the shift speed corresponding to the accelerating speed ratio Sa. The decelerating force Fad may be such that, for example, the torque corresponding to the shift speed which corresponds to the accelerating speed ratio Sa is obtained, and the decelerating force Fad is calculated based on this torque, the vehicle speed, and so on, similarly to the above-described calculation of the torques $Tr_1$ to $Tr_6$.

Furthermore, the control unit 20 performs processing to evaluate a force to cause the vehicle to slip. For this purpose, first, the control unit 20 obtains the curvature γ at a point that is two seconds ahead by processing of the speed ratio control unit 21d (step S715). Specifically, the control unit 20 estimates the point when the vehicle travels for two seconds at the current speed of the vehicle, obtains at least three shape interpolation points or nodes closest to this point, and obtains the curvature γ at this point based on the at least three shape interpolation points or nodes. Moreover, the control unit 20 obtains a friction coefficient μ of the road surface at the point that is two seconds ahead (step S720). The friction coefficient μ of the road may be identified in advance. A friction coefficient measured in advance may be recorded in the map information 30a, the friction coefficient of the road surface may be determined by estimation based on the weather or the like, or the friction coefficient may be determined using probe information.

Next, the control unit 20 obtains a threshold LimFad for evaluating a force that causes the vehicle to slip by processing of the speed ratio control unit 21d (step S725). The threshold LimFad in this embodiment is represented by $((\mu \cdot W \cdot S)^2 - Fc(\gamma)^2)^{1/2}$, where W is the weight of the vehicle, S is a coefficient larger than 0 and equal to or smaller than 1, and Fc(γ) is a function indicating a lateral force acting on the vehicle when the vehicle travels on the curvature γ. The weight W, the coefficient S, and the function Fc(γ) are recorded in the recording medium 30 in advance, and the control unit 20 obtains these information referring to the recording medium 30 to calculate the threshold LimFad.

Figure 10:
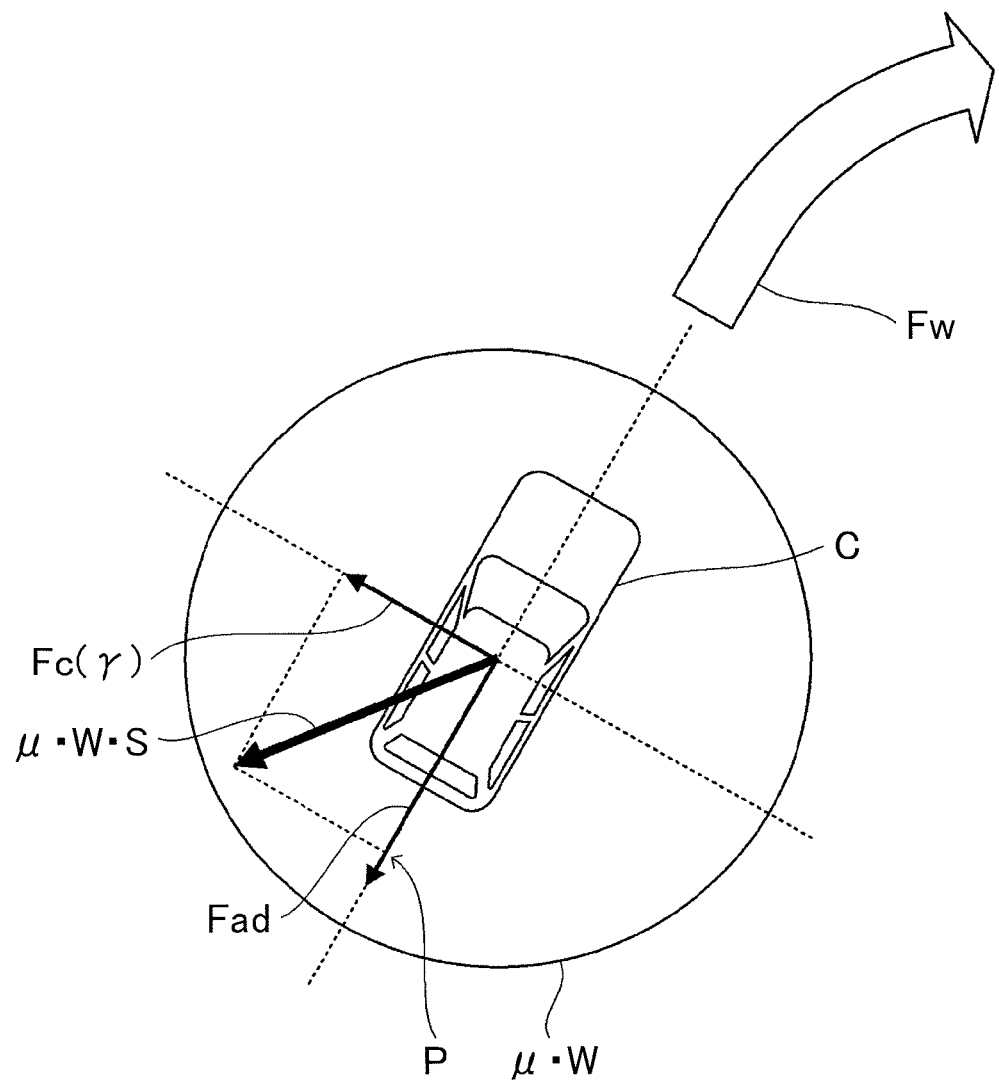
FIG. 10 is an explanatory diagram describing a force acting on a vehicle.

FIG. 10 is an explanatory diagram describing the decelerating force Fad and the threshold LimFad. FIG. 10 shows a vehicle C traveling toward an arrow Fw and the magnitude of the friction force μ·W acting on the vehicle C as a solid circle. In FIG. 10, the vehicle C slips when the front end of a vector showing a force acting on the vehicle C (combined force of the lateral force Fc(γ) and the decelerating force) goes over the solid circle. That is, when the friction force μ·W is divided into the lateral force Fc(γ) and the decelerating force toward the rear side of the vehicle, this decelerating force can be assumed as a critical decelerating force to cause the vehicle to slip.

Thus, in this embodiment, a certain margin is provided for the friction force μ·W, and a value obtained by dividing a value μ·W·S resulted from multiplying the friction force μ·W by a constant S of 1 or smaller into the force toward the rear side of the vehicle based on the lateral force Fc(γ) is set as the threshold LimFad. Specifically, as exemplified in FIG. 10, it is assumed that the traveling stability of the vehicle C decreases when the distal end of the vector indicating the decelerating force Fad is closer to the circumference of the circle than the position P corresponding to the distal end of a component force vector of the vector μ·W·S.

Accordingly, the control unit 20 determines whether the decelerating force Fad is larger than the threshold LimFad or not (step S730), and when it is not determined that the decelerating force Fad is larger than the threshold LimFad, the control unit 20 determines whether the point that is two seconds ahead has passed the start point Rs of the curve section Zr or not (step S735). When it is not determined that the point has passed the start point Rs, the control unit returns to processing shown in FIG. 8. On the other hand, when it is determined in step S730 that the decelerating force Fad is larger than the threshold LimFad, or it is determined in step S735 that the point that is two seconds ahead has passed the start point Rs of the curve section Zr, the speed ratio control state GS is set to "2" so as to allow setting of the speed ratio.

Therefore, when the speed ratio control state GS becomes "2" via step S730 and further processing to set the speed ratio is performed in step S630 after determination in step S615, the speed ratio is set to the accelerating speed ratio Sa before the force acting on the vehicle turns to a force that causes the vehicle to slip. Thus, the speed ratio can be set so as not to cause the vehicle to slip by setting the speed ratio to the accelerating speed ratio Sa, and it is possible to set the speed ratio while suppressing the influence of shifting on the behavior of the vehicle. Here, it is just needed to be possible to evaluate whether the force acting on the vehicle in front of the vehicle would cause the vehicle to slip or not. Other than the structure to evaluate the force at the point after the predetermined time interval from the current time point as described above, a structure to evaluate a force at the position ahead of the current position in a predetermined distance may be employed. Note that the "two seconds" in steps S715, S735 are just an example, and a value may be set that is larger than the time required from when the control signal is output by the speed ratio control unit 21d to the transmission unit 44 so as to change the speed ratio to the accelerating speed ratio Sa until switching of the speed ratio by the transmission unit 44 according to the control signal is completed. For example, in step S735, it may be determined whether the point to be reached at a time or later at which the speed ratio can be switched to the accelerating speed ratio Sa has passed the start point Rs or not. Surely, when the force at the position ahead of the current position in the predetermined distance is employed as described above for evaluating a force at the point after the predetermined time interval from the current time point, it is possible to employ a structure in which the predetermined distance is set to a distance larger than a distance from the start of processing for shifting at the current position to the completion of the shifting.

With the above processing, for example, as shown by the arrow of solid dashed line in FIG. 2, when the vehicle C travels the road before the curve section at the sixth speed and approaches the curve section Zr, deceleration control is performed to achieve the target vehicle speed $V_0$ before the start point Rs of the curve section Zr. On the road before the curve section, the accelerating speed ratio Sa is calculated in the speed ratio obtaining processing. Further, in this speed ratio obtaining processing, the curvature γ of the road that is two seconds ahead of the vehicle C is obtained, and the speed ratio control state GS is set to "2" in the stage when this γ becomes large and the decelerating force Fad surpasses the threshold LimFad. Thus, the shift speed becomes, for example, the third speed by processing in step S630 when the accelerating speed ratio Sa is the speed ratio corresponding to the third speed. Therefore, as shown by the thick dot and dash line in FIG. 2, the shift speed is kept to the third speed throughout the road before the curve section after the processing, the curve section Zr, and the acceleration section Za, and thus acceleration can be performed smoothly when acceleration is started in the acceleration section Za.

(3) Other Embodiments

The embodiment above is an example for implementing the present invention, and various other embodiments may be employed as long as deceleration control is performed by setting a speed ratio for accelerating the vehicle from a target vehicle speed when the vehicle travels a predetermined section. For example, the target vehicle speed is calculated from the radius R of the curve section Zr, but of course a target vehicle speed may be correlated to each curve section in advance so as to obtain this correlated target vehicle speed. Further, the target of applying the present invention is not limited to the curve section, and a structure to set a section where the vehicle travels while keeping a target vehicle speed (or at a vehicle speed equal to or lower than the target vehicle speed) as the predetermined section may be employed. Examples include a section in a predetermined distance before and after the point of an ETC (Electronic toll collection) gate where it is recommended to decelerate the vehicle to a vehicle speed limit or lower when the vehicle is passing through the ETC gate, a low speed section where it is instructed that the vehicle travels at or lower than a vehicle speed limit, and the like. The predetermined section may be defined by a location. Moreover, when a section in which the vehicle speed limit is set serves as the predetermined section, this vehicle speed limit may be set as the target vehicle speed (for example, 20 km/h for the ETC gate and 10 km/h for the low speed section).

Moreover, the present invention is not limited to the structure to obtain the speed ratio corresponding to a necessary acceleration amount, and various structures may be employed as long as they can determine a speed ratio with which acceleration to a vehicle speed higher than a target vehicle speed can be achieved. For example, it is possible to employ a structure to learn in advance the rotation speed of the driving source (engine or motor) corresponding to the throttle opening/closing operation after the vehicle travels a predetermined section such as a curve section, operate the driving source at the learned rotation speed after the vehicle travels the predetermined section, and identify the accelerating speed ratio for accelerating the vehicle to a higher vehicle speed from the target vehicle speed, or the like. That is, various structures may be employed as long as the vehicle can accelerate to a speed higher than the target vehicle speed after the vehicle travels the predetermined section, even when the recommended vehicle speed is not identified.

Further, the accelerating speed ratio may be a speed ratio which is a necessary and sufficient speed ratio for accelerating the vehicle at least to a vehicle speed higher than the target vehicle speed, and a speed ratio for smoother acceleration may be determined in advance. For example, it is possible to estimate parameters of a throttle opening operation, the rotation speed of the driving source of the vehicle, and/or the like at the time of starting acceleration, and select a speed ratio or the like with which acceleration can be most efficiently achieved based on this estimation. In addition, for deceleration control, besides performing feedback control based on the deceleration as described above, a structure to perform feedback control based on the vehicle speed may be employed.

Moreover, the necessary acceleration amount may be a parameter for evaluating energy to be outputted in the vehicle so as to change the vehicle speed from the target vehicle speed to the recommended vehicle speed, and is not limited to the above-described necessary acceleration a. For example, it is possible to employ torque, engine output, or the like. Further, in the above-described embodiment, the example of a section defined by the acceleration section Za and the above-described predetermined distance $L_0$ and the acceleration section Za are the clothoid section, but these sections may of course be determined in advance as a section for decelerating the vehicle and a section for accelerating the vehicle, respectively, and may be shorter or longer than the clothoid section. Further, they may not necessarily be the clothoid section, and for example, a predetermined section between a certain curve section and a next curve section may be an acceleration section when there are continuous curve sections. Moreover, shifting to the accelerating speed ratio may be performed before the vehicle reaches the predetermined section. The shifting may be performed at the start point of the predetermined section or the start point Ca of a section defined by the predetermined distance $L_0$, or the shifting may be performed when the necessary deceleration Gr surpassed the thresholds LimG_h, LimG_L. Thus, it is possible to employ various structures.

Further, in the above-described embodiment, it is structured to perform deceleration control when the necessary deceleration Gr has surpassed the thresholds LimG_h, LimG_L, but of course other structures, for example a structure to start deceleration after the vehicle passes the start point Ca of a section defined by the predetermined distance $L_0$, may be employed. Furthermore, in the vehicle speed limiting processing, it is structured to decelerate the vehicle when the current vehicle speed Vc is higher than the target vehicle speed $V_0$, but it may be structured to accelerate the vehicle when the current vehicle speed Vc is lower than the target vehicle speed $V_0$. Moreover, in the above-described embodiment, the speed ratio which minimizes fuel consumption is selected as the accelerating speed ratio Sa among speed ratios with which torque larger than the torque Tra corresponding to the necessary acceleration a can be outputted, but the accelerating speed ratio may be determined based on other ideas. For example, the torque Tra corresponding to the necessary acceleration a and the torques $Tr_1$ to $Tr_6$ outputted with respective speed ratios may be obtained, and the smallest speed ratio among the speed ratios with which torque larger than the torque Tra can be generated may be set as the accelerating speed ratio Sa.

Specifically, the accelerating speed ratio Sa is set to a speed ratio with which the speed of the vehicle can be changed to the recommended vehicle speed $V_1$ when acceleration is performed with the necessary acceleration a while keeping the speed ratio, and with which the engine speed corresponding to the throttle opening $Th_1$ is transmitted to the output side at a reduced speed of which degree of reduction is the smallest. With this structure, the vehicle can accelerate from the target vehicle speed V0 to the recommended vehicle speed V1 while suppressing increase of the engine speed as much as possible, and it is possible to accelerate the vehicle efficiently. Note that although the engine speed corresponding to the throttle opening Th1 is assumed here, this engine speed may of course be determined based on statistic values or the like.

Moreover, the transmission unit 44 includes the stepped torque converter in the above-described embodiment, but the present invention may be applied to a vehicle in which a transmission unit including a continuously variable transmission capable of changing the speed ratio continuously is mounted. Specifically, in the continuously variable transmission, it may be structured to control the speed ratio by control based on plural parameters, and to perform control to achieve the accelerating speed ratio by this control before the vehicle reaches the predetermined section. For example, the torque Tra corresponding to the above-described necessary acceleration a is obtained, and the engine speed at which torque equivalent to the torque Tra can be outputted with the throttle opening $Th_1$ and at the target vehicle speed $V_0$ is identified. Then, the speed ratio is controlled so as to eliminate the difference between the target engine speed and the engine speed while the vehicle is traveling before the vehicle reaches the predetermined section.

With the above structure, the present invention can be applied to a vehicle including a continuously variable transmission. Of course, the object to be controlled is not limited to the engine speed. A parameter to be fixed may be changed appropriately among the parameters (throttle opening, vehicle speed, engine speed, and speed ratio). That is, in the continuously variable transmission, various structures can be employed as long as it is possible to set to the accelerating speed ratio in the stage before the vehicle reaches the predetermined section.

Moreover, the present invention may be applied to a hybrid vehicle. Specifically, in the hybrid vehicle, part of a drive force generated by the engine is transmitted to an electric motor as regeneration energy to charge a rechargeable battery. Accordingly, it may be structured to perform control such that deceleration is performed by engine braking accompanying obtaining this regeneration energy and by the braking unit in the deceleration control processing shown in FIG. 6.

The invention claimed is:

1. A driving support device, comprising:
vehicle speed information obtaining unit that obtains a target vehicle speed "$V_0$" when a vehicle travels a predetermined section ahead of the vehicle and a recommended vehicle speed "$V_1$" after the vehicle travels the predetermined section;
accelerating speed ratio obtaining unit that obtains a necessary acceleration amount "a" for accelerating the vehicle from the target vehicle speed "$V_0$" to the recommended vehicle speed "$V_1$" after the vehicle travels the predetermined section, obtains a necessary torque corresponding to the necessary acceleration amount, and obtains an accelerating speed ratio "Sa" with which a torque equal to or larger than the necessary torque can be generated;
speed ratio control unit that sets a speed ratio of a transmission unit which transmits a drive force of a power unit to wheels of the vehicle to the accelerating speed ratio "Sa" before the vehicle reaches a start point "Rs" of the predetermined section; and
deceleration control unit that reduces a speed of the vehicle to the target vehicle speed "$V_0$" before the vehicle reaches the start point "Rs" of the predetermined section,
wherein a front section is set before the predetermined section, as the section in which the deceleration control by the deceleration control unit is performed before the vehicle reaches the predetermined section,
wherein an acceleration section "Za" from an end point "Re" of the predetermined section to a predetermined point "Ce" is set after the predetermined section, wherein the predetermined point "Ce" is separated from the end point "Re" by a distance "$L_1$",
wherein the recommended vehicle speed "$V_1$" is the vehicle speed at the predetermined point "Ce" of the acceleration section "Za",
wherein the necessary acceleration amount "a" is the acceleration amount required to accelerate the vehicle from the target vehicle speed "$V_0$" to the recommended vehicle speed "$V_1$" in the distance "$L_1$" of the acceleration section "Za",
wherein the speed ratio control unit sets the speed ratio of the transmission unit to the accelerating speed ratio "Sa" while the vehicle travels in the front section, and
wherein the deceleration control unit obtains a necessary deceleration "Gr" for changing a current vehicle speed "Vc" at a current position of the vehicle traveling in the front section to the target vehicle speed "$V_0$" in a distance "Lc" between the current position of the vehicle and the end "Rs" of the front section, and reduces the speed of the vehicle based on the obtained necessary deceleration "Gr" while the vehicle travels in the front section.

2. The driving support device according to claim 1, wherein the vehicle speed information unit obtains the recommended vehicle speed "$V_1$" correlated with a road after the predetermined section.

3. The driving support device according to claim 2, wherein the accelerating speed ratio obtaining unit obtains the distance "$L_1$" of the acceleration section "Za" set after the end point "Re" of the predetermined section, and obtains as the necessary acceleration amount "a" the acceleration amount for accelerating the vehicle from the target vehicle speed "$V_0$" to the recommended vehicle speed "$V_1$" at the distance "$L_1$".

4. The driving support device according to claim 1, wherein the accelerating speed ratio obtaining unit obtains as the accelerating speed ratio "Sa" a speed ratio which minimizes fuel consumption among speed ratios with which an acceleration amount equal to or larger than the necessary acceleration amount "a" can be generated when a driving source of the vehicle is at a predetermined rotation speed.

5. The driving support device according to claim 2, wherein the accelerating speed ratio obtaining unit obtains as the accelerating speed ratio "Sa" a speed ratio which minimizes fuel consumption among speed ratios with which an acceleration amount equal to or larger than the necessary acceleration amount "a" can be generated when a driving source of the vehicle is at a predetermined rotation speed.

6. The driving support device according to claim 3, wherein the accelerating speed ratio obtaining unit obtains as the accelerating speed ratio "Sa" a speed ratio which minimizes fuel consumption among speed ratios with which an acceleration amount equal to or larger than the necessary acceleration amount "a" can be generated when a driving source of the vehicle is at a predetermined rotation speed.

7. The driving support device according to claim 1, wherein the speed ratio control unit estimates a force acting on the vehicle when the speed ratio of the vehicle is set to the accelerating speed ratio "Sa" in front of the vehicle, and sets the speed ratio of the vehicle to the accelerating speed ratio "Sa" before the force acting on the vehicle reaches a force causing the vehicle to slip.

8. The driving support device according to claim 2, wherein the speed ratio control unit estimates a force acting on the vehicle when the speed ratio of the vehicle is set to the accelerating speed ratio "Sa" in front of the vehicle, and sets the speed ratio of the vehicle to the accelerating speed ratio "Sa" before the force acting on the vehicle reaches a force causing the vehicle to slip.

9. The driving support device according to claim 3, wherein the speed ratio control unit estimates a force acting on the vehicle when the speed ratio of the vehicle is set to the accelerating speed ratio "Sa" in front of the vehicle, and sets the speed ratio of the vehicle to the accelerating speed ratio "Sa" before the force acting on the vehicle reaches a force causing the vehicle to slip.

10. The driving support device according to claim 4, wherein
the speed ratio control unit estimates a force acting on the vehicle when the speed ratio of the vehicle is set to the accelerating speed ratio "Sa" in front of the vehicle, and sets the speed ratio of the vehicle to the accelerating speed ratio "Sa" before the force acting on the vehicle reaches a force causing the vehicle to slip.

11. The driving support device according to claim 5, wherein
the speed ratio control unit estimates a force acting on the vehicle when the speed ratio of the vehicle is set to the accelerating speed ratio "Sa" in front of the vehicle, and sets the speed ratio of the vehicle to the accelerating speed ratio "Sa" before the force acting on the vehicle reaches a force causing the vehicle to slip.

12. The driving support device according to claim 6, wherein
the speed ratio control unit estimates a force acting on the vehicle when the speed ratio of the vehicle is set to the accelerating speed ratio "Sa" in front of the vehicle, and sets the speed ratio of the vehicle to the accelerating speed ratio "Sa" before the force acting on the vehicle reaches a force causing the vehicle to slip.

13. A driving support method, comprising the steps of:
obtaining, by a control device, vehicle speed information by obtaining a target vehicle speed "$V_0$" when a vehicle travels a predetermined section ahead of the vehicle and a recommended vehicle speed "$V_1$" after the vehicle travels the predetermined section;
obtaining, by the control device, a necessary acceleration amount "a" for accelerating the vehicle from the target vehicle speed "$V_0$" to the recommended vehicle speed "$V_1$" after the vehicle travels the predetermined section, obtaining a necessary torque corresponding to the necessary acceleration amount, and obtaining an accelerating speed ratio "Sa" with which a torque equal to or larger than the necessary torque can be generated;
performing, by the control device, speed ratio control in which a speed ratio of a transmission unit which transmits a drive force of a power unit to wheels of the vehicle is set to the accelerating speed ratio "Sa" before the vehicle reaches a start point "Rs" of the predetermined section; and
performing, by the control device a deceleration control in which a speed of the vehicle is reduced to the target vehicle speed "$V_0$" before the vehicle reaches the start point "Rs" of the predetermined section,
wherein a front section is set before the predetermined section, as the section in which the deceleration control by the deceleration control unit is performed before the vehicle reaches the predetermined section,
wherein an acceleration section "Za" from an end point "Re" of the predetermined section to a predetermined point "Ce" is set after the predetermined section, wherein the predetermined point "Ce" is separated from the end point "Re" by a distance "$L_1$",
wherein the recommended vehicle speed "V1" is the vehicle speed at the predetermined point "Ce" of the acceleration section "Za",
wherein the necessary acceleration amount "a" is the acceleration amount required to accelerate the vehicle from the target vehicle speed "$V_0$" to the recommended vehicle speed "$V_1$" in the distance "$L_1$" of the acceleration section "Za",
wherein the speed ratio control unit sets the speed ratio of the transmission unit to the accelerating speed ratio "Sa" while the vehicle travels in the front section, and
wherein the deceleration control unit obtains a necessary deceleration "Gr" for changing a current vehicle speed "Vc" at a current position of the vehicle traveling in the front section to the target vehicle speed "$V_0$" in a distance "Lc" between the current position of the vehicle and the end "Rs" of the front section, and reduces the speed of the vehicle based on the obtained necessary deceleration "Gr" while the vehicle travels in the front section.

14. A non-transitory computer-readable medium storing a driving support program enabling a computer to perform the functions of:
obtaining vehicle speed information by obtaining a target vehicle speed "$V_0$" when a vehicle travels a predetermined section ahead of the vehicle and a recommended vehicle speed "$V_1$" after the vehicle travels the predetermined section;

obtaining a necessary acceleration amount "a" for accelerating the vehicle from the target vehicle speed "$V_0$" to the recommended vehicle speed "$V_1$" after the vehicle travels the predetermined section, obtaining a necessary torque corresponding to the necessary acceleration amount, and obtaining an accelerating speed ratio "Sa" with which a torque equal to or larger than the necessary torque can be generated;

performing speed ratio control in which a speed ratio of a transmission unit which transmits a drive force of a power unit to wheels of the vehicle is set to the accelerating speed ratio "Sa" before the vehicle reaches a start point "Rs" of the predetermined section; and performing deceleration control in which a speed of the vehicle is reduced to the target vehicle speed "$V_0$" before the vehicle reaches the start point "Rs" of the predetermined section, wherein a front section is set before the predetermined section, as the section in which the deceleration control by the deceleration control unit is performed before the vehicle reaches the predetermined section, wherein an acceleration section "Za" from an end point "Re" of the predetermined section to a predetermined point "Ce" is set after the predetermined section, wherein the predetermined point "Ce" is separated from the end point "Re" by a distance "$L_1$", wherein the recommended vehicle speed "$V_1$" is the vehicle speed at the predetermined point "Ce" of the acceleration section "Za", wherein the necessary acceleration amount "a" is the acceleration amount required to accelerate the vehicle from the target vehicle speed "$V_0$" to the recommended vehicle speed "$V_1$" in the distance "$L_1$" of the acceleration section "Za", wherein the speed ratio control unit sets the speed ratio of the transmission unit to the accelerating speed ratio "Sa" while the vehicle travels in the front section, and wherein the deceleration control unit obtains a necessary deceleration "Gr" for changing a current vehicle speed "Vc" at a current position of the vehicle traveling in the front section to the target vehicle speed "$V_0$" in a distance "Lc" between the current position of the vehicle and the end "Rs" of the front section, and reduces the speed of the vehicle based on the obtained necessary deceleration "Gr" while the vehicle travels in the front section.

* * * * *